United States Patent [19]

Konzal et al.

[11] Patent Number: 4,490,130
[45] Date of Patent: Dec. 25, 1984

[54] MACHINE FOR FORMING SEAMS OF TWO-PIECE PAPER CUPS

[75] Inventors: Daryl R. Konzal, Colgate; Craig N. Johnson; Donald W. Baumgartner, both of Milwaukee, all of Wis.

[73] Assignee: Paper Machinery Corporation, Milwaukee, Wis.

[21] Appl. No.: 291,323

[22] Filed: Aug. 10, 1981

[51] Int. Cl.³ .......................... F26B 3/00; B31C 1/06
[52] U.S. Cl. ................................. 493/106; 493/134; 432/226
[58] Field of Search ............... 493/134, 133, 129, 108, 493/107, 106, 105, 104; 34/105, 104; 432/224, 225, 226, 230; 156/497

[56] References Cited

U.S. PATENT DOCUMENTS

| | | | |
|---|---|---|---|
| 2,942,530 | 6/1960 | Bodendoerfer | 93/36.1 |
| 3,134,307 | 5/1964 | Loeser | 93/36.1 |
| 3,364,825 | 1/1968 | Baumgartner | 93/36 |
| 3,724,093 | 4/1973 | Olila | 493/134 X |
| 3,825,408 | 7/1974 | Farfaglia et al. | 493/134 X |
| 4,035,926 | 7/1977 | Farfaglia | 34/105 X |
| 4,074,619 | 2/1978 | Feliks | 493/134 X |
| 4,317,323 | 3/1982 | Richards et al. | 493/134 X |
| 4,349,400 | 9/1982 | Gilden | 493/134 X |

*Primary Examiner*—James F. Coan
*Attorney, Agent, or Firm*—James E. Nilles

[57] ABSTRACT

In a machine for making two-piece flat bottom paper cups, having a mandrel on which the cup is formed, the portions of the two blanks that are to form the bottom seam are heated by a device comprising a stationary air duct with which the mandrel can be coaxially aligned. Air flowing forwardly in the duct from an inlet at its rear is heated by an electric element therein. On the front of the duct a nozzle is mounted to slide between a forward operative position and a rearward inoperative one. Cooperating throttle elements on the nozzle and the duct restrict flow to radial outlets in the nozzle when it is in operative position, ensuring steady air flow through the duct. An annular heat shield around the nozzle enables it to effect combined radiant and hot air heating. All heaters are arranged for retraction if the machine stops for longer than a normal dwell period.

15 Claims, 22 Drawing Figures

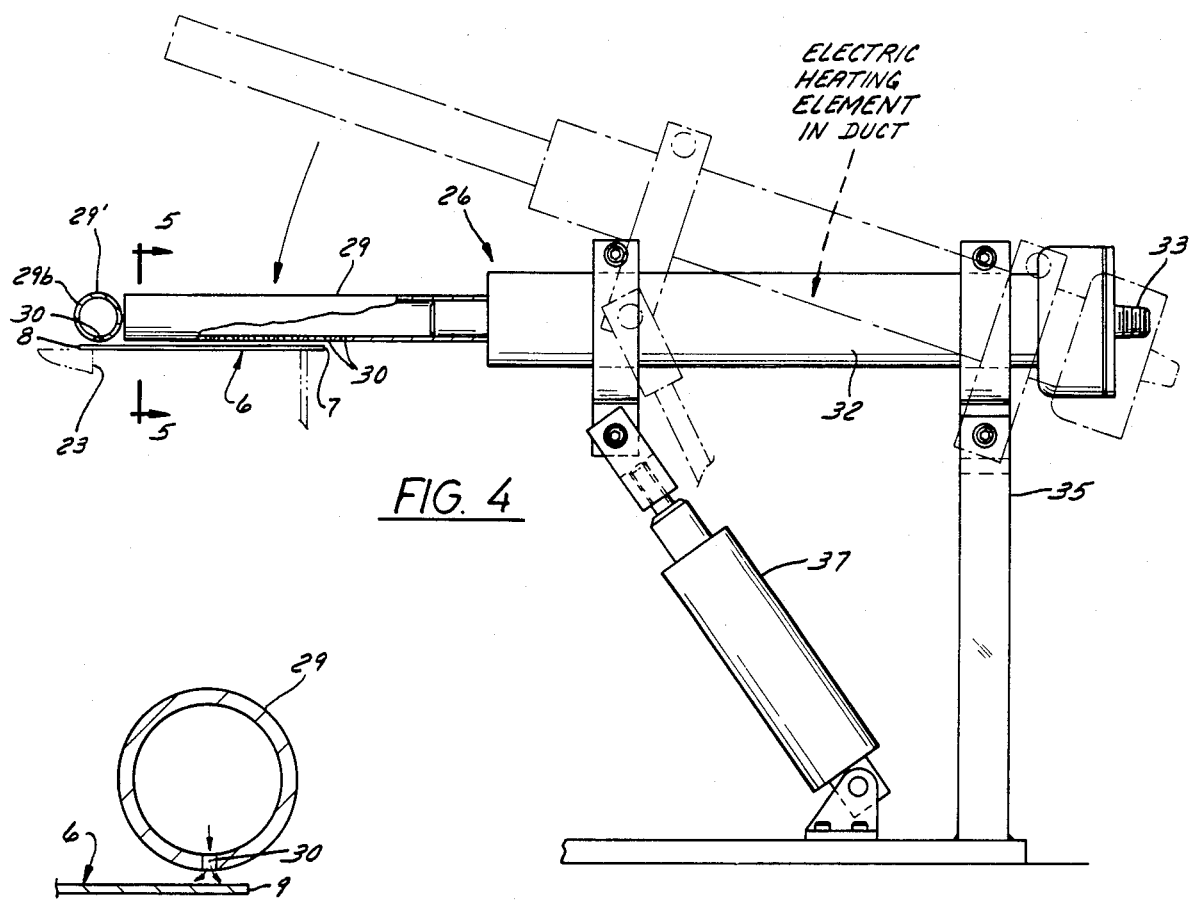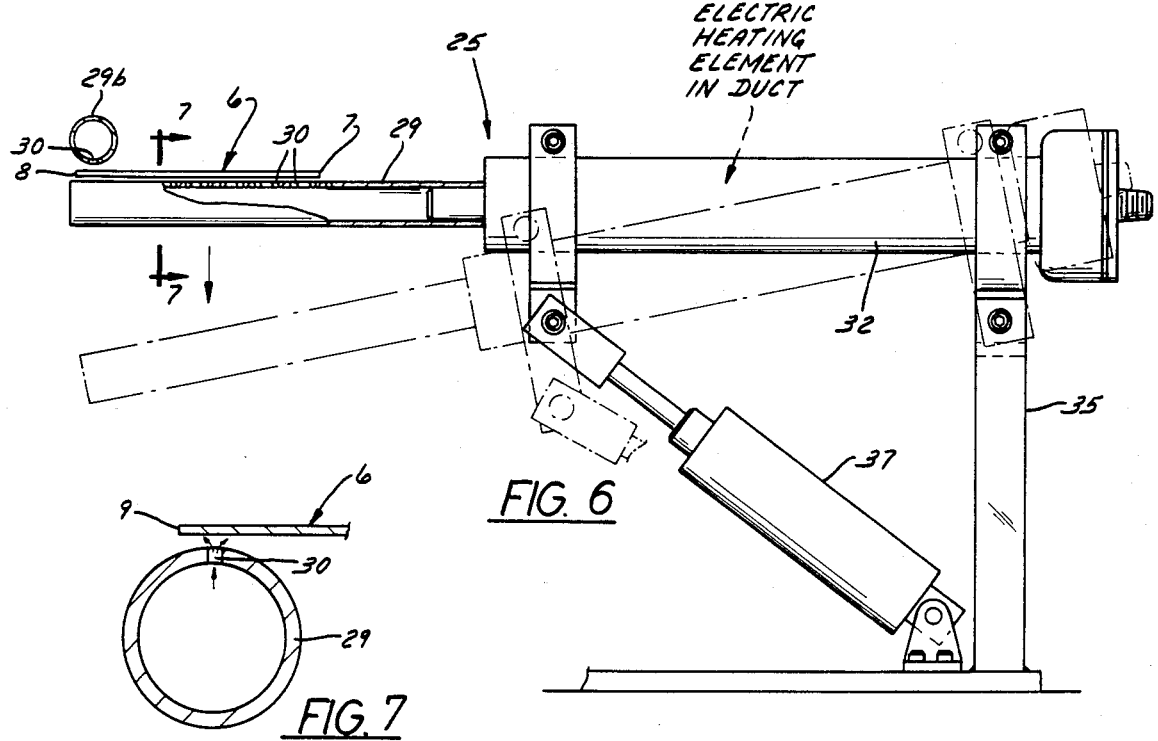

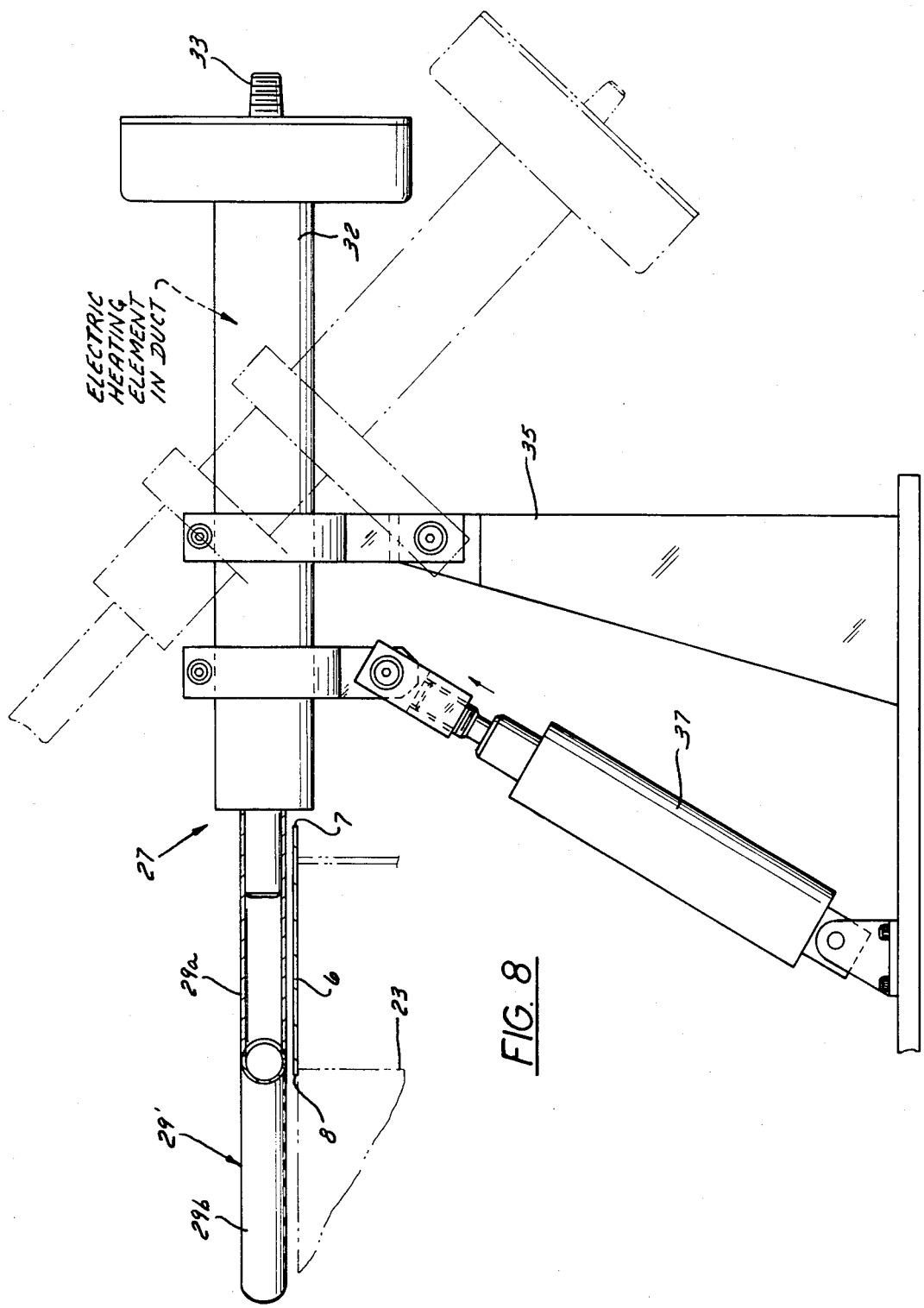

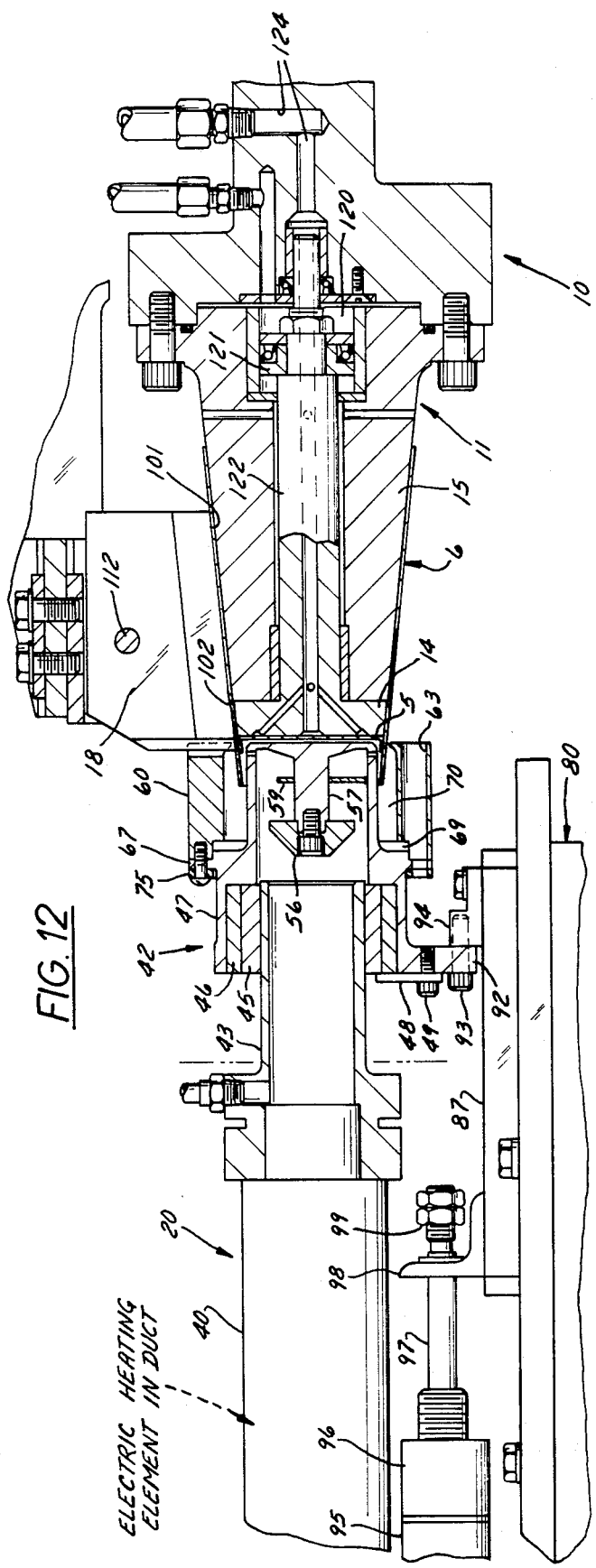

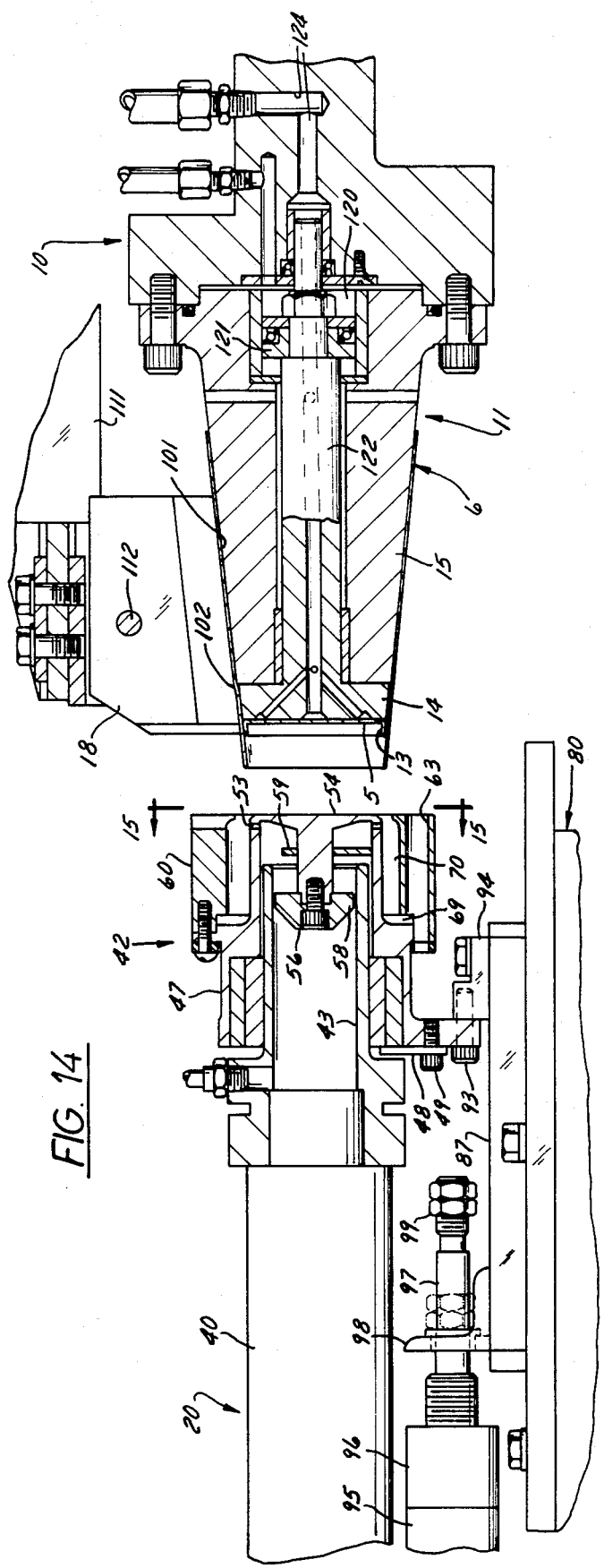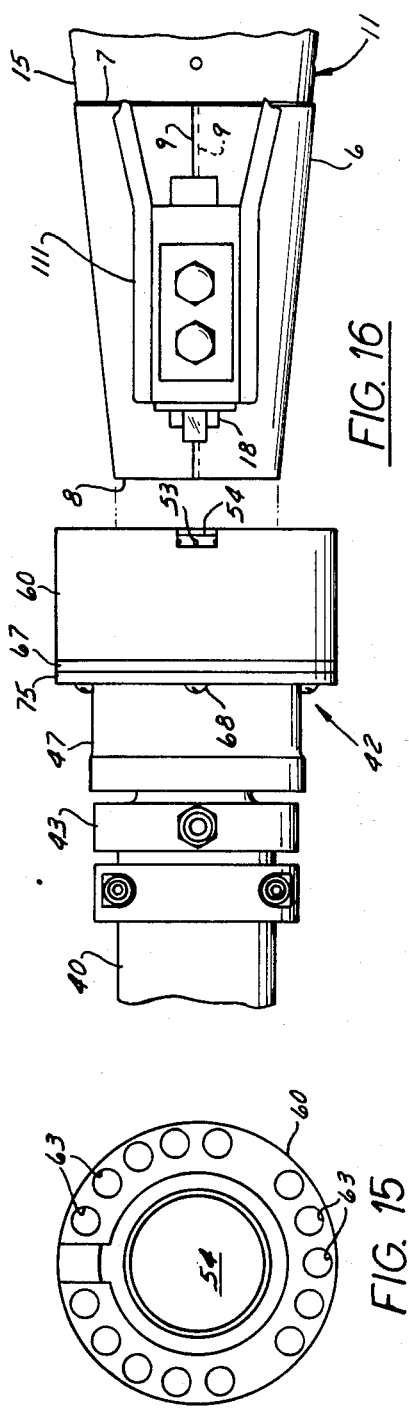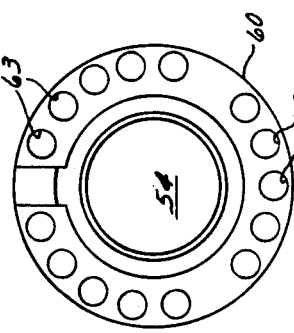

MACHINE FOR FORMING SEAMS OF TWO-PIECE PAPER CUPS

FIELD OF THE INVENTION

This invention relates to machines for the manufacture of two-piece paper cups that are coated with thermoplastic material and have fused seams; and the invention is more particularly concerned with improved means in such a cup making machine for heating those areas of the cup blanks at which seams are to be formed.

BACKGROUND OF THE INVENTION

A two-piece paper cup produced by a machine of the type to which this invention relates is made up from a side wall blank and a circular bottom wall blank. If the cup is to be cylindrical the side wall blank is rectangular. For a downwardly tapering cup the side wall blank is more or less keystone-shaped with arcuate top and bottom edges and straight, upwardly divergent side edges. In either case the circular blank that is to form the bottom wall of the cup has its marginal portion deformed into a downwardly projecting flange.

Insofar as the mechanisms for manufacturing tapered cups differ from those for producing cylindrical cups, tapered cups present somewhat more complex problems. Therefore, for purposes of example, the following explanation is specific to the manufacture of tapered cups but it is also generally applicable to untapered cylindrical paper cups and containers.

The machine on which the blanks are assembled and formed into a cup has a turret with a vertical axis, comprising a number of mandrels that project radially from the axis and are carried to each of a succession of stations by indexing rotation of the turret. In a machine for making tapered cups the mandrels are frustoconical, and each tapers in the direction away from the turret axis and has at is small diameter outer end a flat surface in which there are suction inlet openings. In the operation of the machine, a flanged bottom wall blank is concentrically attached by suction to the flat end surface of a mandrel, with its flange projecting away from the mandrel. Thereafter a side wall blank is wrapped around the mandrel and the bottom wall blank. This wrapping brings the marginal side edge portions of the side wall blank into an overlapped relationship in which they can be bonded to one another to form a side seam. It is also necessary for the flange of the bottom wall blank to be bonded to the side wall to form a bottom seam. Other operations may then be performed upon the top and bottom edges of the cup side wall, but the formation of well bonded, leak-proof side and bottom seams is of the essence.

U.S. Pat. No. 3,134,307 to D. B. Loeser disclosed apparatus for forming the side seam of a cup, comprising a plurality of heated elements on the turret, one adjacent to each mandrel. When a side wall blank was wrapped around a mandrel, the heated element adjacent to that mandrel moved down into engagement with the overlapped side edge portions of the blank, clamping them against the mandrel. The heated element remained in contact with the blank through a certain amount of turret rotation, melting the plastic coating on the portions of the blank that it engaged, and then it moved away from the mandrel to be replaced by a cooling element which similarly engaged the side wall seam through further stages of turret rotation to cool and solidify the molten plastic into an adhesive bond. The apparatus was complicated and somewhat troublesome because it had to have a heating element and a cooling element for each mandrel, rotary connections for bringing electric current to each heating element and for bringing cooling fluid to each cooling element, and mechanism for actuating the heating and cooling elements in synchronism with turret rotation. Another important disadvantage was that each heating element, by reason of its long period of direct contact with the side wall, could not only melt the coating, as was desired, but could remove areas of coating and the underlying printing.

With the apparatus of this Loeser patent, the bottom seam was intended to be formed with a roller device that was disclosed in the earlier U.S. Pat. No. 2,942,531 to Loeser et al. The roller device of the latter patent merely applied clamping pressure to the bottom blank flange and its adjacent portion of the side wall, relying on glue to form the bond at the bottom seam. The use of glue with thermoplastic-coated blanks was of course inefficient because the thermoplastic coating can serve nicely as an adhesive bonding agent if the machine has satisfactory means for melting the coating on the bottom seam areas of the blanks.

U.S. Pat. No. 3,364,825, issued to D. W. Baumgartner in 1968, disclosed apparatus that represents a more recent state of the art. In the machine of that patent there was a second turret which was rotatable about an upright axis, and it picked up flat side wall blanks and carried each of them edgewise through a pair of heating stations before presenting it to a mandrel on the first turret to be wrapped around it. At each heating station the marginal areas of the side wall blank along its side and bottom edges were subjected to contact heating by means of heating elements that were shaped to conform to the areas to be heated. Two substantially identical heating stations were provided in order to have each heating element in contact with the blank for only a brief period of time. Through such successive brief contacts with heating elements, the seam-forming areas of the coating were brought up to the required temperature for fusion bonding without danger that the blank would be subjected to excessive heat that might cause the coating or any ink on the paper to be picked off, sublimed or charred.

Although the apparatus of the Baumgartner patent was reasonably satisfactory in operation, it had to be maintained in good adjustment. The duration of heating element contact at each station had to be on the order of one-quarter second and was thus critically brief. There was further criticality in that the side wall blank had to be brought into assured contacting engagement with each heating element but excessive clamping force could not be exerted against a blank lest coating be picked off of it and adhere to the element. Furthermore, the temperature of each heating element had to be maintained within predetemined limits, notwithstanding the intermittent withdrawal of heat from the element as blanks moved into and out of heat transfer contact with it, and notwithstanding the tendency of an electric heating element to heat rather slowly.

Since the heating elements that engaged the side wall blank were formed to melt its plastic coating not only along its side edges but also in the zone along the bottom edge of that blank, a bottom seam could be formed by ensuring intimate contact between that zone of the side wall blank and the flange on the bottom blank. To this end the Baumgartner patent recommended employment of the roller device disclosed in the above-mentioned Loeser et al patent. In later practice, however, the bottom seam was bonded by thrusting the bottom blank a distance towards the bottom of the cup to bring it into engagement with molten coating on the side wall blank and, in the case of a tapered cup, to take advantage of the downward taper of the cup side wall.

Although reasonably satisfactor bottom seams could be formed when only the bottom portion of the side wall blank had been heated, it was obviously preferable if the flange portion of the bottom blank were also heated, so that its plastic coating could also contribute to the adhesive bonding at the bottom seam.

In general, it has been evident for some time that contactless heating of the seam forming areas of the blanks is preferable to contact heating of those areas, and it has also been apparent that contactless heating of the blank portions that comprise the bottom seam is both particularly desirable and particularly difficult to achieve with a completely satisfactory heating device.

One prior device for effecting contactless heating of the bottom seam areas has comprised a solid steel bar which was moved cyclically between an open gas flame that maintained it at red heat and a position adjacent to the outer end of the mandrel, within the bottom portion of the side wall blank, where the hot bar effected radiant heating of the seam-forming portions of the blanks. Although this device was satisfactorily effective when operating normally, its need for an open gas flame was undesirable, not only because of the obvious fire hazard but also because the gas flame could be blown out, necessitating shut-down of the machine. Furthermore, the surface of the bottom blank flange on which melting of coating was needed was its radially outer surface, but the coating on that surface was in the "shadow" of the flange itself, and therefore radiant heat could not reach it effectively.

Another expedient for heating the bottom portion of the cup also required a gas flame, but in that case hot gases from the flame were directed towards the cup bottom.

It might be supposed that an electric heating element could be readily substituted for a gas flame in a device for heating the portions of cup blanks that comprise the bottom seam. However, the fact that gas flames continue to be used in cup forming machines, notwithstanding their obviously undesirable characteristics, demonstrates that this seemingly obvious substitution is not, in reality, one that is easily accomplished. An electric heating element tends to heat comparatively slowly, and therefore heat should be abstracted from it at a fairly steady rate in order to ensure that it will maintain a stable temperature.

Another and more significant characteristic of electric heating elements is their inability to withstand vibrations and high accelerations. In a paper cup machine, the device that heats the bottom portion of the cup must move toward the outer end of the mandrel while the mandrel dwells at the station at which such heating takes place, and the heating device must thereafter move back away from the mandrel, in order to be clear of the cup, before the mandrel is carried away from that station by turret rotation. Since paper cup machines produce substantially in excess of 100 cups per minute, it is evident that an electric heating element cannot be allowed to partake of the necessarily rapid advance and withdrawal of the heating device that must take place during the fractional-second dwell of a mandrel at the heating station. Furthermore, if the electric heating element is stationarily mounted and is used to heat a stream of air that is delivered to a nozzle for discharge towards the cup bottom, the air stream passing the heating element cannot be allowed to develop any substantial pulsation as a result of advance and retraction of the nozzle, because such variations in stream flow would impart vibrations to the heating element that would break it in a surprisingly short time.

Since an electric heating element employed for heating the bottom-seam-forming portions of cup blanks must be mounted in a fixed position, it must obviously be remote from the heat applying device that moves toward and from the turret axis, and therefore heat has to be conducted from the heating element to that device. It is apparent that a moving stream of air—provided it has steady flow—affords a satisfactory medium for such heat transfer, and is also a desirable medium for contactless application of heat to the seam forming portions of cup blanks. But because of the heat transfer characteristics of air, not enough heat can be applied to the cup blanks by merely blowing hot air against them during the limited period of dwell available at the bottom heating station under practical conditions of air flow rate and heating element size.

Another consideration that has to be borne in mind with respect to heating devices in a paper cup machine is that the machine can be stopped on occasion—either intentionally or because of a malfunction—while cup blanks are in juxtaposition to the heating devices. It goes without saying that heating devices in commercially available cup machines function satisfactorily under normal conditions of machine operation, but in many cases heat continues to be applied to cup blanks during any stoppage of the machine, and the overheated cup blanks are ruined. Loss of a few cup blanks is in itself inconsequential, but the significant problem that almost invariably arises when cup blanks are overheated is that the overheated material of the cup blank and its coating sticks to the heating devices and other parts of the machine and has to be completely and laboriously removed before the machine can be put back into operation.

Thus a completely satisfactory cup machine should form tight, neat, heat fused bottom and side seams, should have electric elements as its heat sources, and should not need clean-up after a stoppage or shut down. So far as is known, no cup making machine heretofore available has fully met all of these criteria.

SUMMARY OF THE INVENTION

The general object of the present invention is to provide, in a paper cup making machine of the character described, a heating device operating at a heating station to which each mandrel on the cup-forming turret is indexed, which heating device applies heat to both the bottom portion of the side wall blank and the flange portion of the bottom wall blank and employs an electric heating element as its heat source.

More specifically, therefore, it is an object of this invention to provide, in a paper cup machine, a heating device of the character described that comprises an electric heating element which is mounted in a fixed position and is therefore not subject to harmful vibrations or accelerations, a movable nozzle through which a stream of air that has been passed across the heating element is directed towards appropriate portions of paper cup blanks, and means associated with the nozzle for maintaining a substantially constant and steady flow of air across the heating element notwithstanding that the nozzle has a pump-like action as it advances towards an operative position where it is effective to heat cup blanks on a mandrel and retracts to an inoperative position where it is well clear of the orbit of the mandrels and the cup blanks that they carry.

Another specific object of this invention is to provide a heating device of the character described that applies heat to the bottom-seam-forming portions of cup blanks by directing hot air to those portions of the cup blanks, to ensure melting of the plastic coating on the radially outer surface of the flange on the bottom wall blank, and also by subjecting the bottom portion of the cup to radiant heat, to ensure application of an adequate amount of heat to the cup blanks during the brief period of dwell of a mandrel at the heating station.

Another important object of this invention is to provide a paper cup making machine of the character described having heating devices which are capable of being rapidly moved away from blanks on the machine in the event of any stoppage of the machine that continues beyond a normal period of turret dwell, to prevent destruction of blanks during such stoppage and the consequent necessity for cleaning up portions of the machine.

In general, these objects are achieved in a machine for making two-piece flat bottom paper cups of thermoplastic coated paper, each comprising a side wall blank and a disc-like bottom wall blank that has its margin formed as a circumferential axially projecting flange portion, said machine comprising a mandrel of circular cross-section around which a side wall blank is rolled and which has at its outer end a flat outwardly facing surface against which a bottom wall blank is held with its flange portion projecting outwardly and surrounded by a bottom portion of the rolled side wall blank. The machine is characterized by heating means for melting coating on said portions of the blanks to provide for their adhesion to one another, said heating means comprising a stationary air duct with which the mandrel can have coaxial alignment and which has a rear end remote from the mandrel wherein there is an air inlet. There is an electric heater in said air duct for heating air that flows forwardly therethrough from said inlet. The air duct opens forwardly into a hollow nozzle body which is axially slideable on the front end portion of said air duct between a forward operative position and a rearward inoperative position. The front end portion of the nozzle body has an outside diameter to be closely concentrically receivable within the bottom portion of a rolled side wall blank on the mandrel and has circumferentially spaced air outlets that open radially outwardly from its interior. The nozzle body and the air duct have cooperating throttling portions which restrict flow of air from the air duct to the air outlets when the nozzle body is in its inoperative position and which permit substantially unrestricted flow of air from the air duct to said outlets when the nozzle body is in its operative position.

An annular heat shield concentrically surrounds the nozzle body in radially spaced relation to it and defines with it an annular passage in which hot air issuing from the air outlets can flow rearwardly. In the heat shield there is a further passage, opening to its front, spaced radially outwardly from said annular passage and communicated with said annular passage near the rear end of the latter. Preferably said further passage is defined by circumferentially spaced axially extending bores in the rather thick tubular wall of the heat shield. Preferably, too, the radially inner surface of the heat shield is reflective, to direct heat to the nozzle body, and the outer surface of the nozzle body is oxidized.

In the specific case of a machine for manufacture of downwardly tapering paper cups, it is an object of the present invention to eliminate the heretofore conventional end ring on the small diameter end of each frustoconical mandrel, which ring surrounded the plunger that shifted the bottom wall blank to its final position relative to the side wall blank and was very troublesome because it tapered to an annular knife edge that was very fragile. In the machine of the present invention the plunger is frustoconical, with a taper corresponding to that of the fixed mandrel body, but the diameter of the large diameter end of the plunger is slightly smaller than that of the small-diameter end of the fixed mandrel body; and the side seam clamping block that cooperates with each mandrel has an offset portion in its surface that engages the mandrel, whereby the clamping block has clamping cooperation with the mandrel all along its length when the plunger is in its retracted position.

BRIEF DESCRIPTION OF DRAWINGS

In the accompanying drawings, which illustrate what is now regarded as a preferred embodiment of the invention:

FIG. 4 is a view mainly in elevation (but with a portion broken away and shown in section) of the upper surface heater that comprises one of the heating stations shown in FIG. 2;

FIG. 5 is a view in section taken on the plane of the line 5—5 in FIG. 4;

FIG. 6 is a view generally similar to FIG. 4 but showing the bottom surface heater that comprises the other of the heating stations shown in FIG. 2;

FIG. 7 is a view in section taken on the plane of the line 7—7 in FIG. 6;

FIG. 8 is a view generally similar to FIG. 4 but showing the curved heater that comprises part of both heating stations shown in FIG. 2;

FIG. 12 is a fragmentary view in vertical section taken at the heating station of the first turret, showing the nozzle of the heating device in its operative position;

FIG. 13 is a view in section, on a somewhat enlarged scale, taken on the plane of the line 13—13 in FIG. 19;

FIG. 14 is a view generally similar to FIG. 12 but showing the nozzle of the heating device in its retracted inoperative position;

FIG. 15 is a view taken on the plane of the line 15—15 in FIG. 14;

FIG. 16 is a view in top elevation that corresponds generally to FIG. 14;

DETAILED DESCRIPTION OF PREFERRED EMBODIMENT OF THE INVENTION

General Arrangement of Machine

A machine 4 that embodies the principles of this invention makes two-piece cups from paper stock of a known type that is coated on each surface with a thin film of thermoplastic. The thermoplastic coatings render the paper impervious to water and the like and provide for heat-fused bonding of the seams of the cup.

The machine 4 is herein shown and described in an embodiment specifically intended for the manufacture of downwardly tapered paper cups. To those skilled in the art it will be obvious from this example how the principles of this invention can be adapted to a machine for manufacture of untapered cylindrical paper cups and containers.

Figure 1:
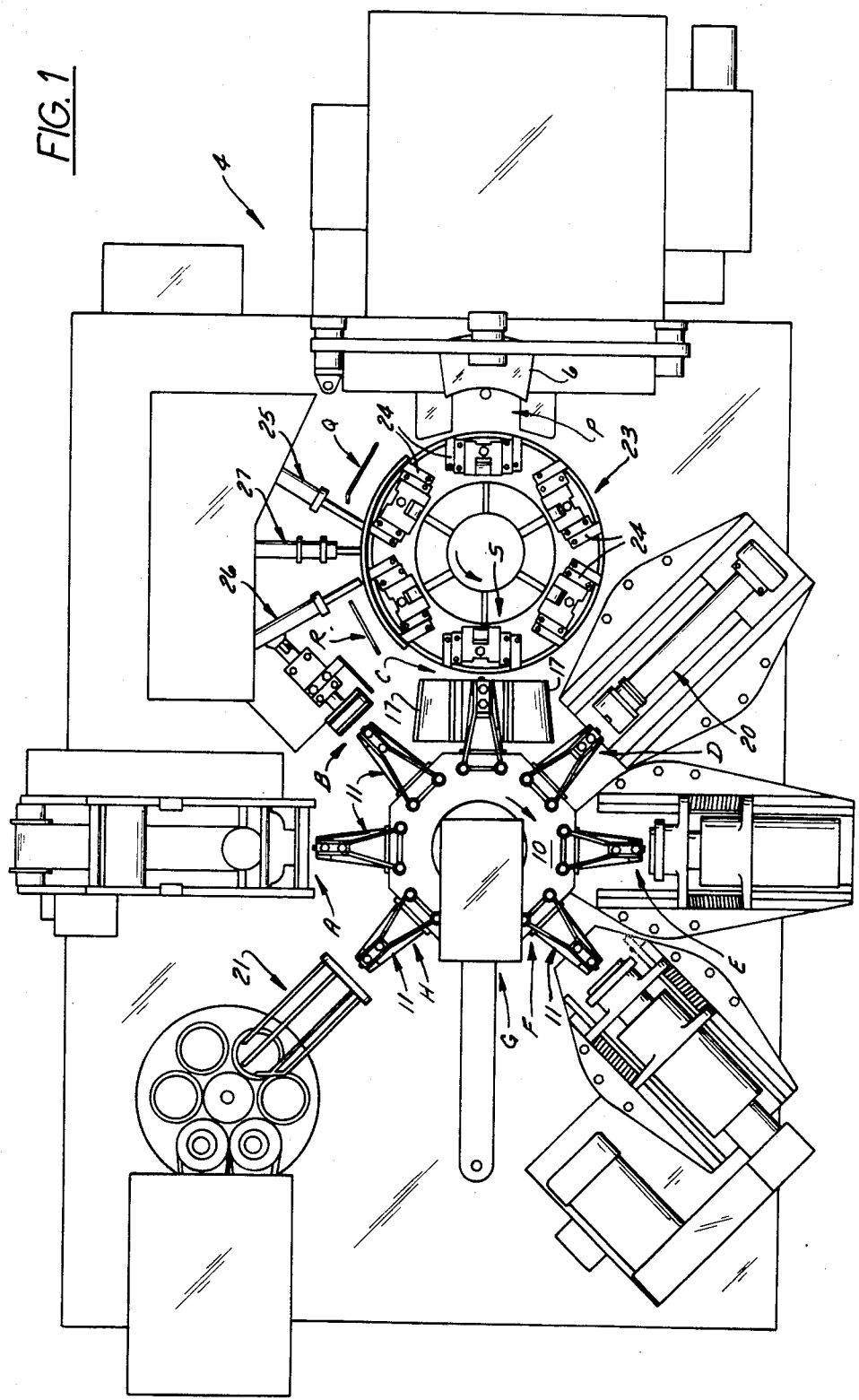
FIG. 1 is a plan view of a cup making machine embodying the principles of this invention.
Figure 2:
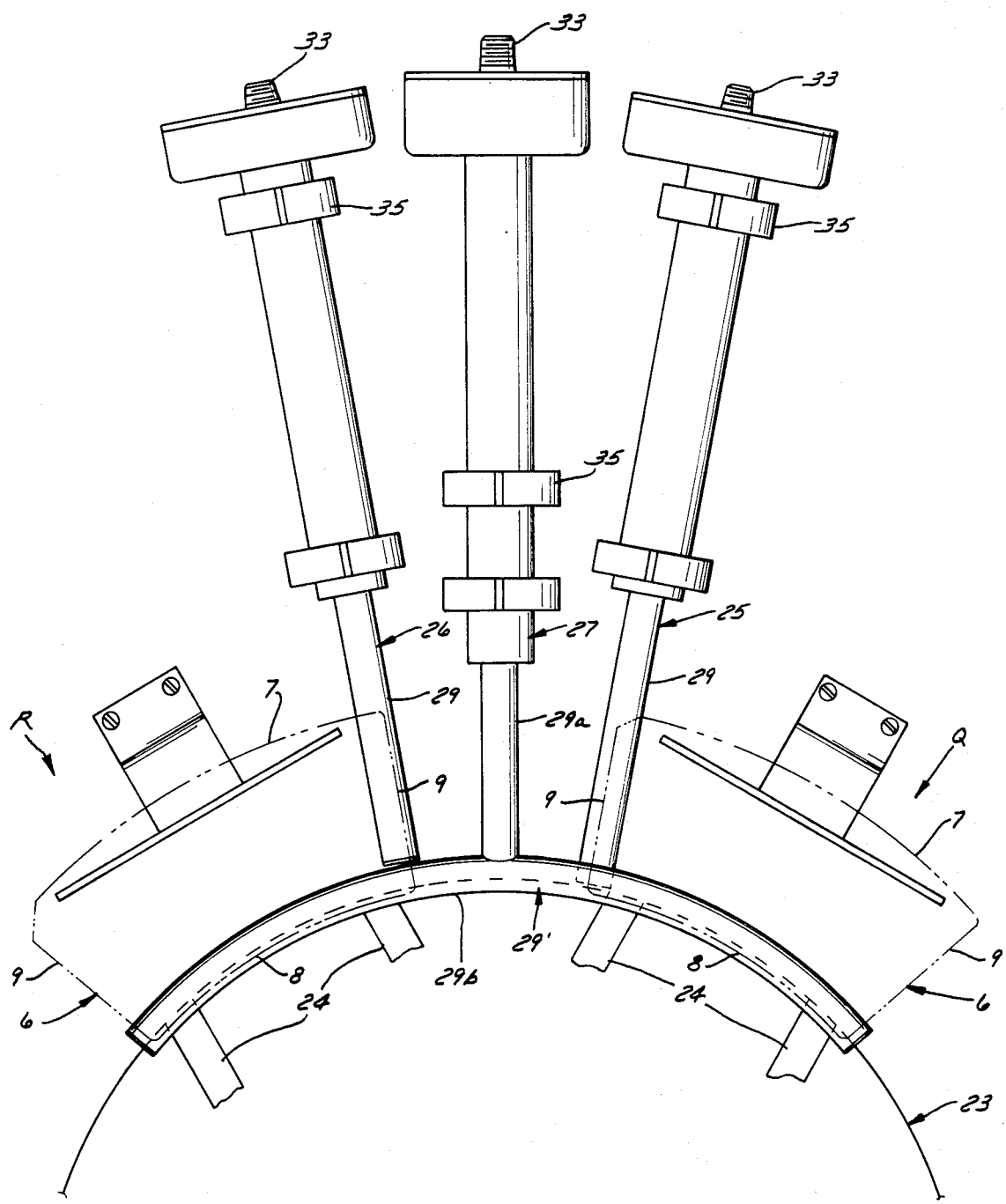
FIG. 2 is a fragmentary plan view on an enlarged scale of the heating stations for the second turret, at which portions of side wall blanks are heated.
Figure 3:
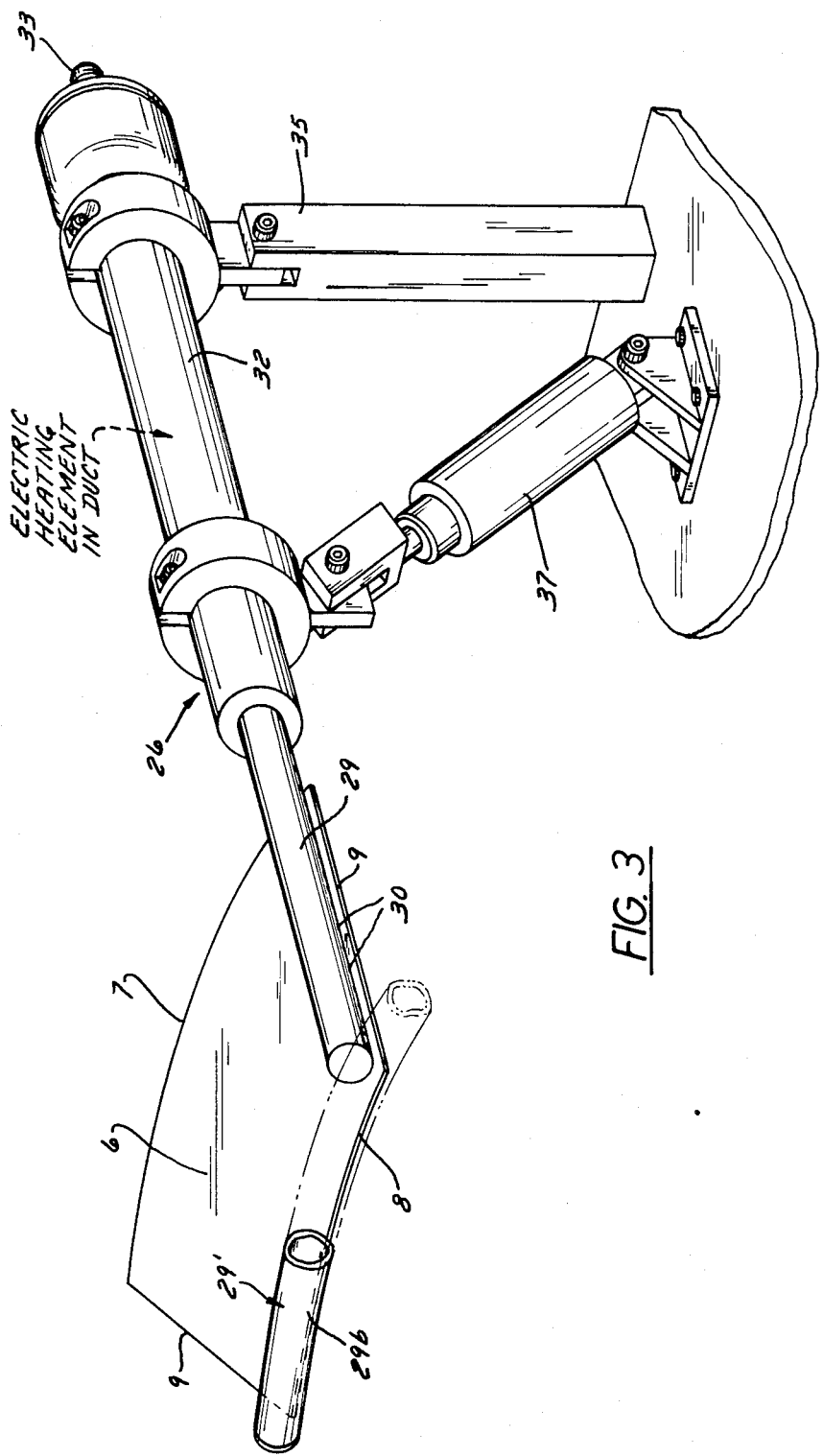
FIG. 3 is a fragmentary perspective view of the heater at one of the heating stations shown in FIG. 2.
Figure 9:
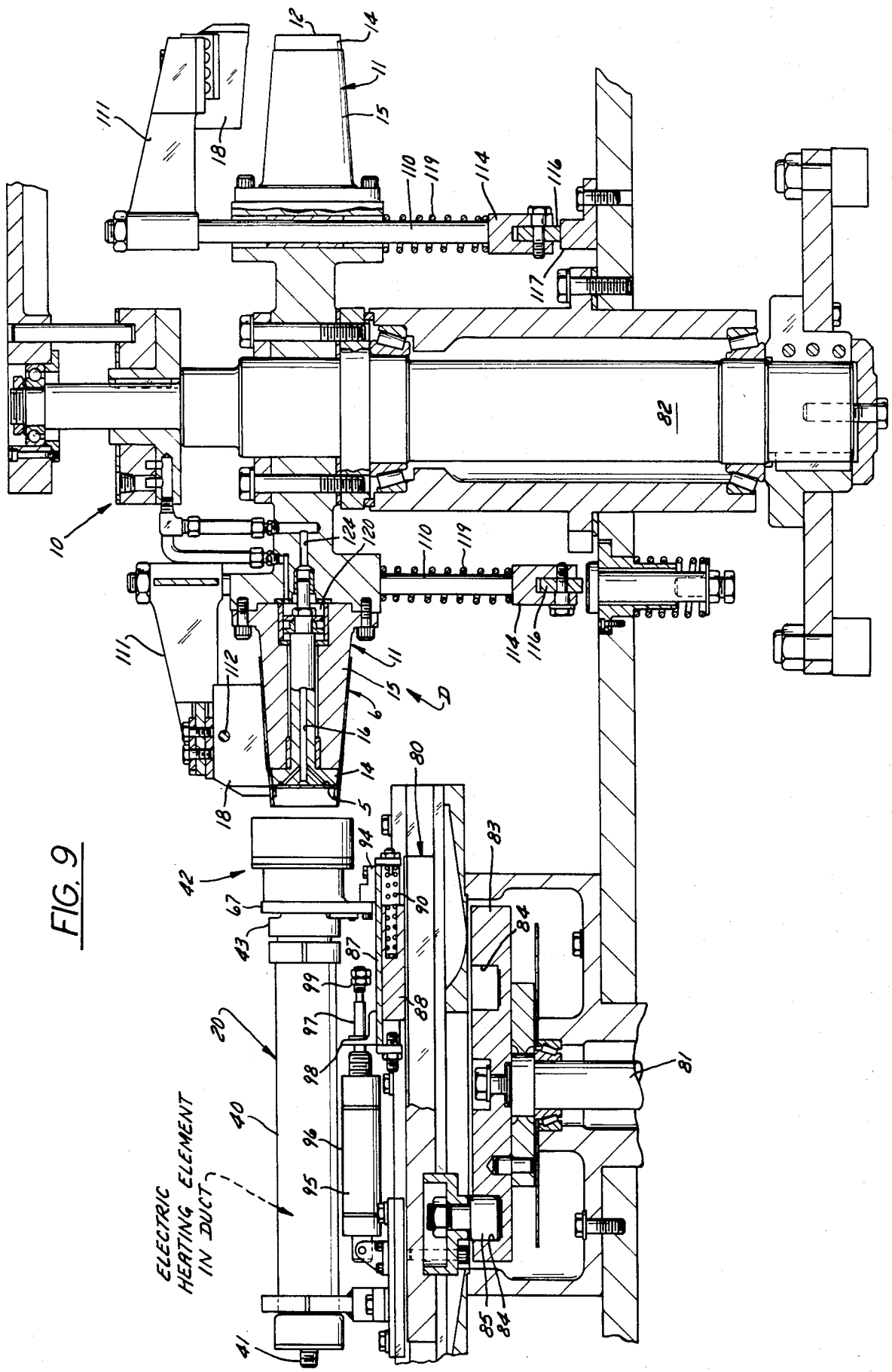
FIG. 9 is a view in vertical section of the first turret of the machine of this invention, on which the side and bottom seams of the cup are formed.
Figure 10:
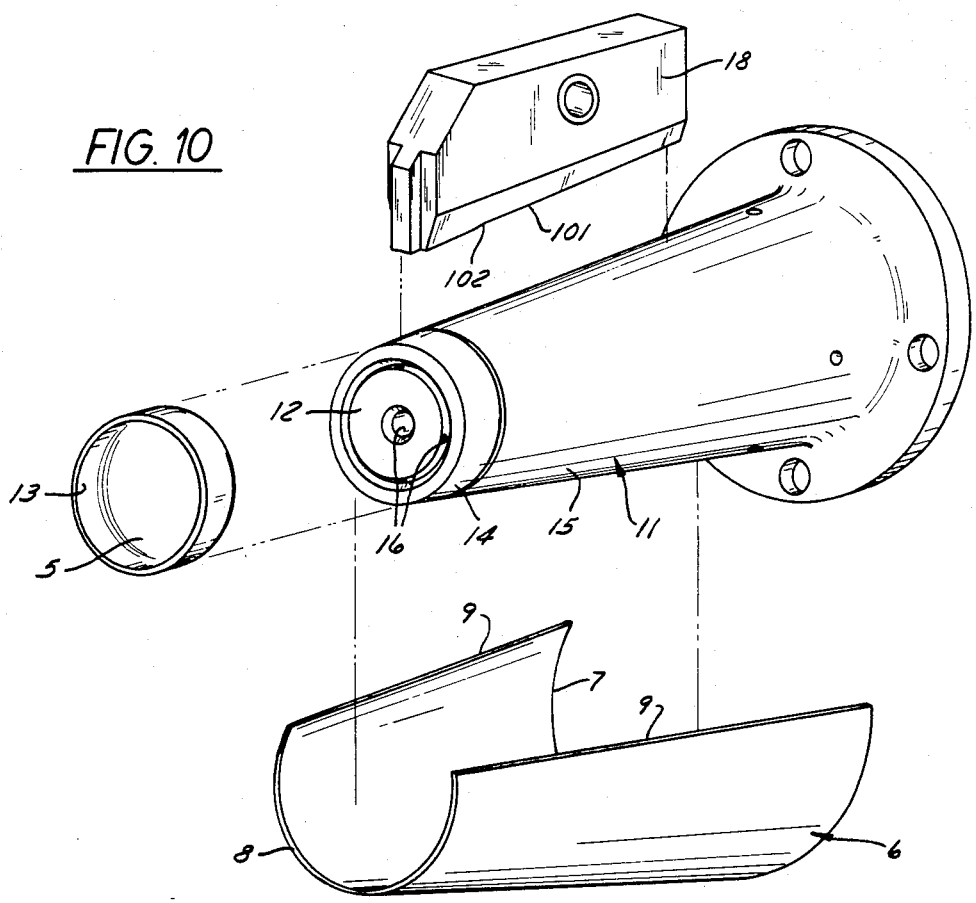
FIG. 10 is a disassembled perspective view showing the relationship between a mandrel of the first turret, side wall and bottom wall blanks, and the clamping block for the mandrel.
Figure 18:
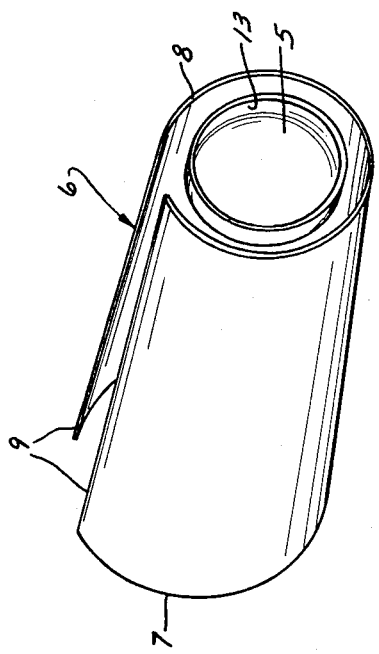
FIG. 18 is a perspective view of the two blanks that form a cup, in partially assembled relationship to one another.

Each cup is made from a circular bottom wall blank 5 (FIGS. 10, 11, 18) and a side wall blank 6 which, in the case of a tapered cup, is more or less keystone shaped, as illustrated in FIGS. 3, 10 and 18. When flat, the side wall blank 6 has arcuately curved top and bottom edges 7 and 8, respectively, and opposite straight side edges 9 that are upwardly divergent. Its top and bottom edges 7 and 8 are curved concentrically, the bottom edge 8 being concavely curved and the top edge 7 convex. In the formation of a cup, the side wall blank 6 is rolled to bring its marginal portions along the side edges 9 into overlapping relationship, so that the blank then defines a downwardly tapering frustoconical side wall, and these overlapped marginal portions are bonded together to form a side seam.

The bottom wall blank 5, initially cut out as a flat circular disc, has its marginal edge portion bent into an axially downwardly projecting circumferential flange 13. In the finished cup, the flange 13 of the bottom wall blank is surrounded by the bottom portion of the side wall and is bonded thereto at a bottom seam.

Figure 11:
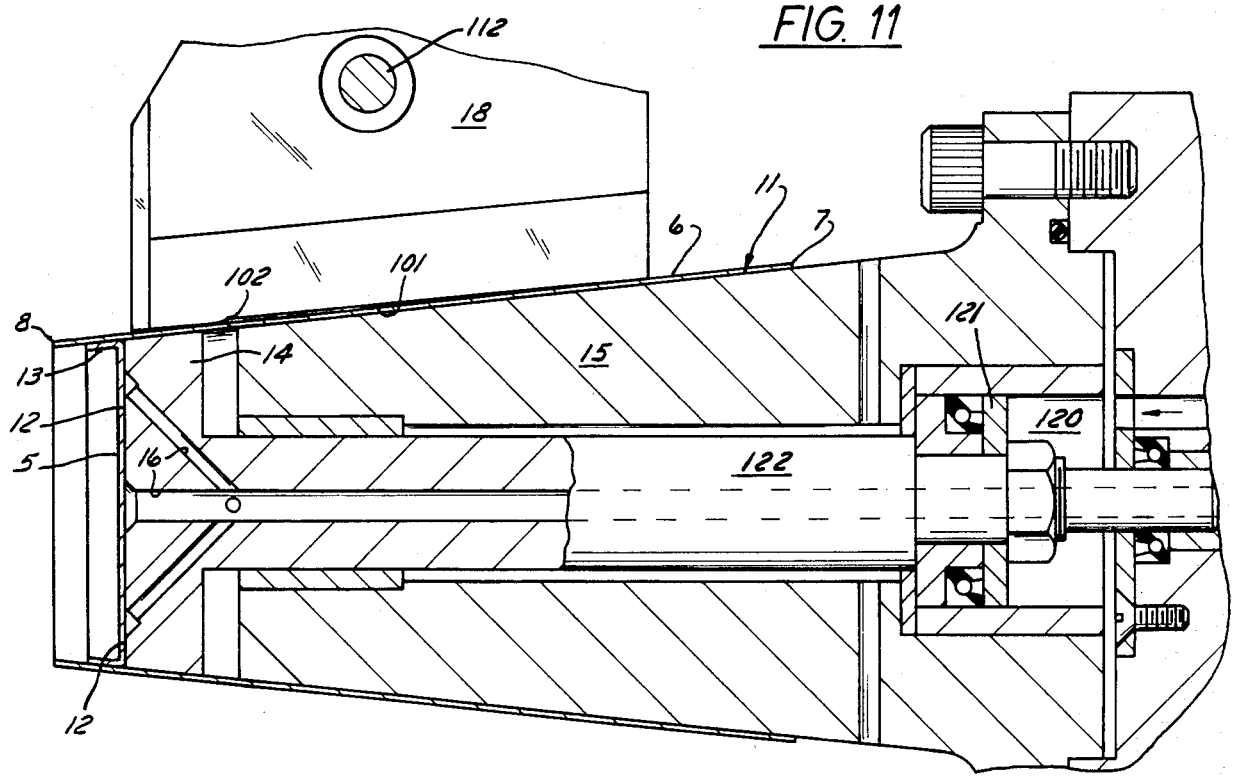
FIG. 11 is a view in vertical section through a mandrel of the first turret, showing its plunger portion extended to dispose the bottom wall blank in finally assembled relation to the side wall blank and showing the clamping block in operative relationship to the mandrel.

The machine 4 that forms side wall blanks 6 and bottom wall blanks 5 into assembled cups has a first turret 10 that rotates indexingly about a vertical axis and comprises a plurality of frustoconical mandrels 11 which project radially outwardly from the turret axis with their axes at uniform angles of divergence to one another. In this case there are eight mandrels 11, and indexing rotation of the turret 10 carries each mandrel to each in turn of eight stations A-H. Each frustoconical mandrel 11 tapers outwardly, that is, in the direction away from the turret axis, and each mandrel has a flat, axially outwardly facing surface 12 at its small diameter outer end, as best seen in FIGS. 10 and 11. The surface 12 is formed on a plunger 14 which comprises a portion of the mandrel at its small diameter end and which is axially outwardly displaceable relative to the main body 15 of the mandrel.

Vacuum inlets 16 open to the flat end surface 12 on each mandrel so that a bottom wall blank 5 can be presented to that surface and held flat against it by suction. Such suction attachment of flat bottom wall blanks to mandrels occurs in a known manner at a station A to which each mandrel is brought by indexing rotation of the turret 10.

At the next station B to which each mandrel 11 is indexed, the flange 13 is formed on the bottom wall blank in a known manner, and it projects outwardly away from the flat outer end surface 12 on the mandrel. At a station C to which the mandrel is next indexed, a side wall blank 6 is rolled around the mandrel in a known manner by means of wrapping wings 17. In addition to the mandrels 11, the first turret 10 carries a set of clamping blocks 18, one for each mandrel. At station C, while the wrapping wings 17 are holding the side wall blank 6 in snugly wrapped relation to the mandrel, the clamping block 18 for the mandrel descends into clamping relationship to the mandrel and engages the overlapped marginal portions along the side edges 9 of the rolled blank, confining them snugly against one another and the mandrel. As fully explained hereinafter, the thermoplastic coating on the opposing surfaces of these overlapped marginal portions has been heated to the melting point just before the side wall blank is wrapped around the mandrel at station C, and the clamping block 18 remains in clamping relation to the mandrel until the coating has cooled back to hardness and has thus bonded the overlapped portions to one another to form a side seam for the finished cup. As is conventional, each clamping block is constrained to indexing rotation with the turret as well as being movable relative to the turret to and from clamping relationship with its mandrel. Although the clamping blocks themselves are generally conventional, they have a novel feature that is described hereinafter.

The rolled side wall blank 6 is so positioned on the mandrel 11 that its lower end portion projects beyond the flange portion 13 of the bottom wall blank 5 on the mandrel, and of course it surrounds that flange. The next station D to which the mandrel 11 is indexed is a heating station at which the bottom portion of the side wall and the adjacent flange portion 13 of the bottom wall blank are heated by means of a novel heating device 20 that is fully described hereinafter. After the heating device 20 has melted the thermoplastic coating on these areas of the two blanks 5, 6, and while the clamping block 18 is still engaging the side wall, the plunger portion 14 of the mandrel 11 is moved axially outwardly a small distance relative to the rest of the mandrel, thrusting the bottom wall blank 5 in the downward direction relative to the side wall. Owing to the downward frustoconical taper of the side wall, such displacement of the bottom wall blank 5 wedges its flange 13 into firm engagement with the side wall all around the cup, and when the thermoplastic coating on these portions of the cup cools to hardness it bonds the two blanks together at a leak-proof bottom seam.

After the bottom wall blank 5 has been axially shifted to its final position in the assembled cup, the mandrel 11 is indexed to further stations E-G at which conventional finishing operations may be performed on its top and bottom edges. At the last station H an air jet issuing from the outer end of the mandrel blows the cup into a discharge chute 21.

Heating of Side Seam Areas

As pointed out above, when a side wall blank 6 is wrapped around a mandrel 11, plastic coating is already in molten condition along the marginal side edge portions of that blank that are to be overlapped for forming the side seam of the cup. For such heating of the side wall blank 6 the machine 4 has a second turret 23 which rotates about a vertical axis, indexing in synchronism with the first turret 10, and by which side wall blanks are carried past heating stations and then presented to the first turret 10 at its station C where the wrapping wings 17 roll the side wall blank around a mandrel.

The second turret 23 is in itself conventional, being of the type disclosed in the above-mentioned Baumgartner U.S. Pat. No. 3,3364,825. It comprises a number of blank carriers 24 (six in this case) that are circumferentially spaced around its axis, each carrier 24 comprising gripper fingers which are actuated to grip a side wall blank 6 at an infeed station P. As supported by a carrier 24, a blank 6 is in a horizontal orientation, to be carried edgewise by indexing rotation of the second turret. Indexing of the second turret 23 carries the gripped side wall blank through heating stations Q and R and to a discharge station S which is adjacent to station C of the first turret. At station S the side wall blank 6 is presented to the wrapping wings 17 and a mandrel 11 on the first turret and is released by the carrier 24 of the second turret.

At the first heating station Q, a bottom heater 25 directs hot air against the bottom surface of the side wall blank 6, in the marginal zone along one of its side edges 9. At the second heating station R, a top heater 26 directs hot air against the top surface of the blank in the marginal zone along its other side edge 9. At both of the heating stations Q and R hot air is also directed against the top surface of the blank 6 in the marginal zone along its concavely curved bottom edge 8, such heating being effected by means of a curved heater 27.

Each of the heaters 25, 26, 27 is essentially a duct that has an elongated front nozzle portion 29 which normally lies closely adjacent to the surface of a blank held by a carrier 24 and which has a row of small, closely spaced outlet holes 30 from which hot air is emitted towards that surface.

The rear portion of each of the heaters 25, 26, 27 comprises an elongated air heating duct 32 which is larger in diameter than its nozzle portion 29 and from which the nozzle portion projects coaxially forwardly. Details of the heating duct 32 are not illustrated because it can be a commercially available hot air gun comprising a number of concentric tubes which define annular passages wherein air flows lengthwise. The tubes are so connected with end walls that the air moves radially inwardly and reverses its direction of lengthwise flow in moving from one such annular passage to another. An electric heating element is disposed in the central passage, through which the air flows forwardly to issue from the nozzle portion 29. The air to be heated can be pressure air from a shop compressor or the like, admitted to the rear end of the heating duct through a suitable inlet, which can be a concentric nipple 33. In each of the top and bottom heaters 25, 26 the front end of the tubular nozzle portion 29 is plugged or blocked, and heated air issues from the small outlet holes 30 which are spaced at substantially uniform intervals along the length of the nozzle at its side adjacent the blanks 6 that are to be heated by it. Because the outlet holes 30 are relatively small, the rate of airflow through each heater 25, 26 is relatively low and the emitted air is very hot. The nozzle portion 29 of each heater 25, 26 is very close to the surface of a blank 6 at the station Q or R for that heater, and therefore air from the heater melts plastic coating on the blank only along its narrow marginal zone at which the side seam is to be formed. However, the blank is spaced far enough from the heater to have little throttling effect upon air flowing out of the heater nozzle, and therefore air flows through each heater 25, 26 at a substantially steady, constant rate that allows a steady constant temperature to be maintained by the electric heating element in the heating duct.

The curved heater 27 differs from the bottom and top heaters 25, 26 essentially only with respect to its nozzle portion 29', which is substantially T-shaped, having a straight, imperforate, tubular stem portion 29a that extends coaxially forwardly from its air heating duct 32 and having an arcuate transverse portion 29b into which the stem portion 29a opens at its front end. The air outlet holes 30 are of course located in the transverse portion 29b, which is curved on the same radius as the concave bottom edge 8 of the side wall blank 6. Since there are many more outlet holes 30 in the nozzle 29' of the curved heater 27 than in the nozzle of either straight heater 25, 26, there is a higher airflow through the heater 27, and therefore the air issuing from it tends to be cooler. However, the heater 27 is intended for preheating the bottom portion of the side wall blank 6 to prevent it from acting as a heat sink when the bottom portion of the cup is heated by the heating device 20 at the heating station D of the first turret; hence the electric heating element for the curved heater 27 can desirably be identical with the heating elements for the bottom and top heaters 25 and 26.

The air emitted from the nozzles 29 of the heaters 25, 26, 27—and especially from the bottom and top heaters 25, 26—is hot enough to damage a side wall blank 6 if the blank remains in proximity to the nozzle for substantially longer than the rather short period of dwell that occurs during indexing rotation of the second turret 23. Therefore, if rotation of the turret 23 is for any reason stopped or prevented for more than a normal dwell period, the heaters are swung away from blanks at the heating stations Q and R. Thus, the air heating duct portion 32 of each of the heaters 25, 26, 27 is supported on a bracket or standard 35 that projects up from the top of the machine frame, and it is pivoted to that bracket 35 to swing about a horizontal pivot axis which extends transversely to the axis of the heating duct 32. Each heater 25, 26, 27 is swung about its pivot axis, to and from an operative position in which its own axis extends horizontally, by means of a double acting pneumatic cylinder jack 37 that is connected between the machine frame and the heating duct 32 of the heater. The top heater 26 and the curved heater 27 are swung upward from their respective operative positions, whereas the bottom heater 25 is swung downward from its operative position. It will be understood that the jacks 37 are actuated under the control of a suitable mechanism responsive to time-of-dwell, the nature of which will be evident to those skilled in the art.

Heater for Bottom Portion of Cup

As a mandrel 11 leaves station C of the first turret 10, a bottom wall blank 5 is held by suction to its flat end surface 12, a side wall blank 6 is rolled around it with marginal portions overlapped for formation of the side seam, and its clamping block 18 is in its operative position, clamping the overlapped portions of the side wall blank against one another and the side surface of the mandrel. From station C the mandrel is indexed directly to heating station D, where the heating device 20 heats the portions of the blanks 5 and 6 that are to comprise the bottom part of the finished cup, melting the coating in the areas that are to form the bottom seam.

The heating device 20 comprises heating duct 40 in which there is an electric heating element and which can be generally like the heating ducts 32 of the side blank heaters 25, 26, 27, having at its rear end a concentric nipple 41 or similar inlet for pressurized air. The heating duct 40 is fixed to the machine frame, so that no motion is imparted to the electric heating element in its interior. Pressure air that has passed through the heating duct 40 to be heated by its heating element issues from a nozzle 42 on the front end of the heating duct that moves concentrically back and forth relative to it. Motion of the nozzle 42 carries it between an extended operative position, shown in FIGS. 12 and 20, and a rearwardly retracted inoperative position, shown in FIGS. 9, 14, 16 and 19. The distance through which the nozzle 42 moves is rather substantial, so that when it is in its operative position its air outlets 53 are closely adjacent to cup blank portions to be heated and when retracted it is spaced far enough from the first turret that it does not cause undesired heating of that turret or its mandrels.

The nozzle 42 slides on a concentric forward extension 43 of the heating duct, which is preferably of stainless steel. The nozzle 42 embraces and is concentrically secured to a carbon ring 45 that slides on the tubular duct extension 43 and serves as a bearing. Carbon has a substantially lower coefficient of thermal expansion than stainless steel, and therefore the carbon ring 45 is initially made with a somewhat oversize inside diameter and is inserted into a hot stainless steel retaining ring 46 which, upon cooling, compressively shrinks the carbon ring. The retaining ring 46, with its carbon ring insert 45, is inserted into a closely fitting rearwardly opening counterbore in the body 47 of the nozzle and is confined against axial displacement relative to the nozzle body by means of a locking plate 48 held to the nozzle body by a screw 49.

Since the nozzle body 47 is made of stainless steel, and the inside diameter of the carbon ring 45 is effectively controlled by thermal expansion and contraction of the stainless steel retaining ring 46, the sliding clearance between the carbon ring 45 and the tubular extension 43 of the heating duct tends to remain substantially constant under all temperature conditions.

The body 47 of the nozzle 42 has a larger diameter rear portion 51 that defines the counterbore in which the carbon bearing ring 45 is received and has a concentric smaller diameter front portion 52 in which the air outlet holes 53 of the nozzle are located. The inside diameter of the front portion 52 is slightly larger than the outside diameter of the heating duct extension 43, so that the front portion 52 of the nozzle body can surround said extension 43 when the nozzle is in its rearward retracted position.

Figure 17:
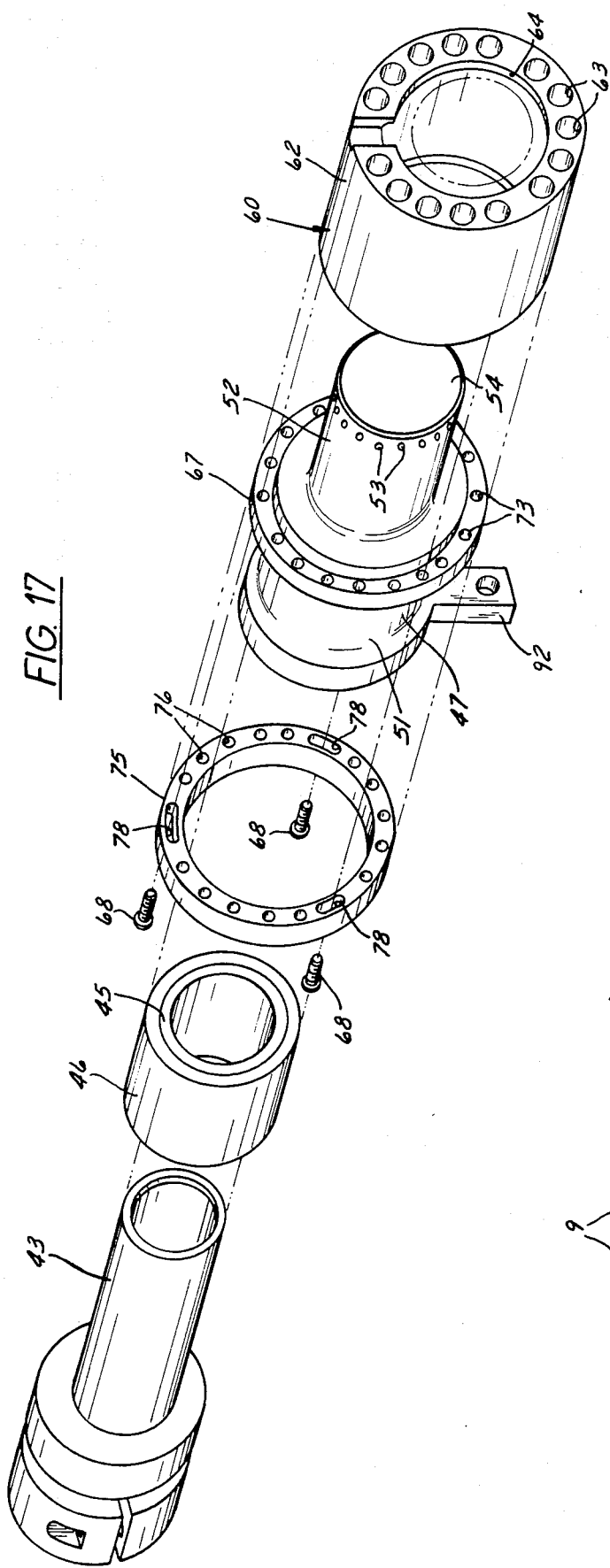
FIG. 17 is an exploded perspective view of the device of this invention for heating the bottom portion of a cup.
Figure 19:
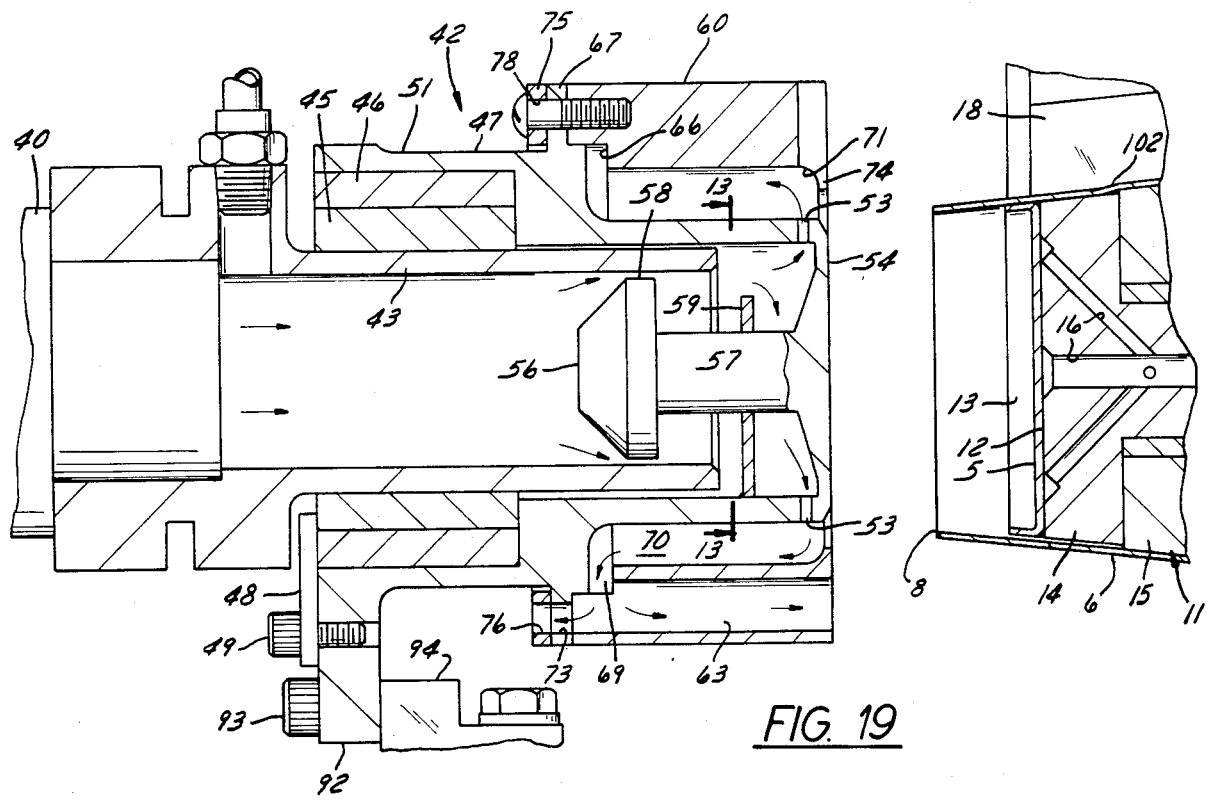
FIG. 19 is a view in longitudinal vertical section through the nozzle of the heating device of this invention, with that nozzle shown in its retracted inoperative position and in relation to a mandrel and its clamping block.
Figure 20:
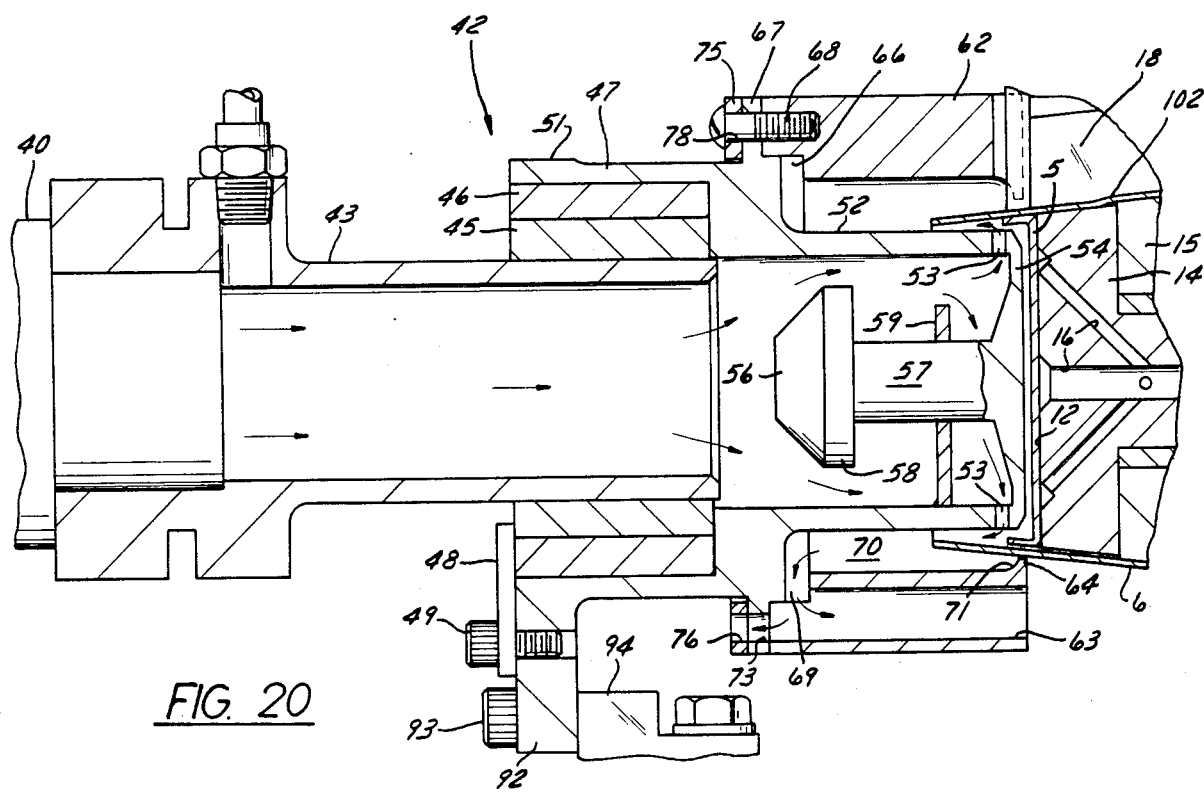
FIG. 20 is a view generally similar to FIG. 19 but showing the nozzle in its extended operative position.
Figure 22:
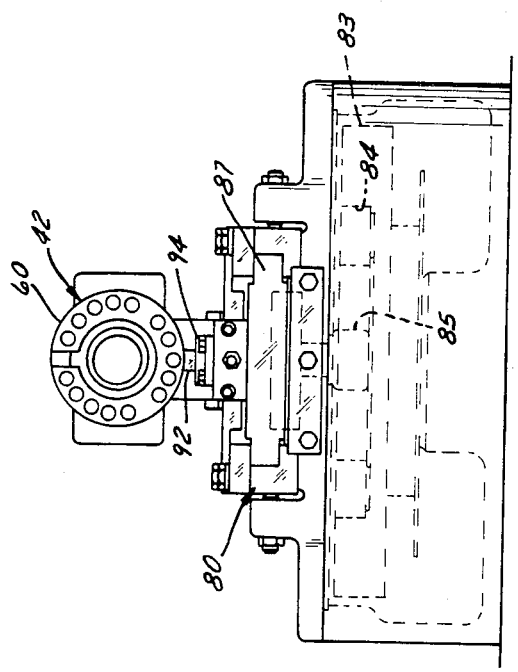
FIG. 22 is a view in elevation taken from the right side of FIG. 21.
Figure 21:
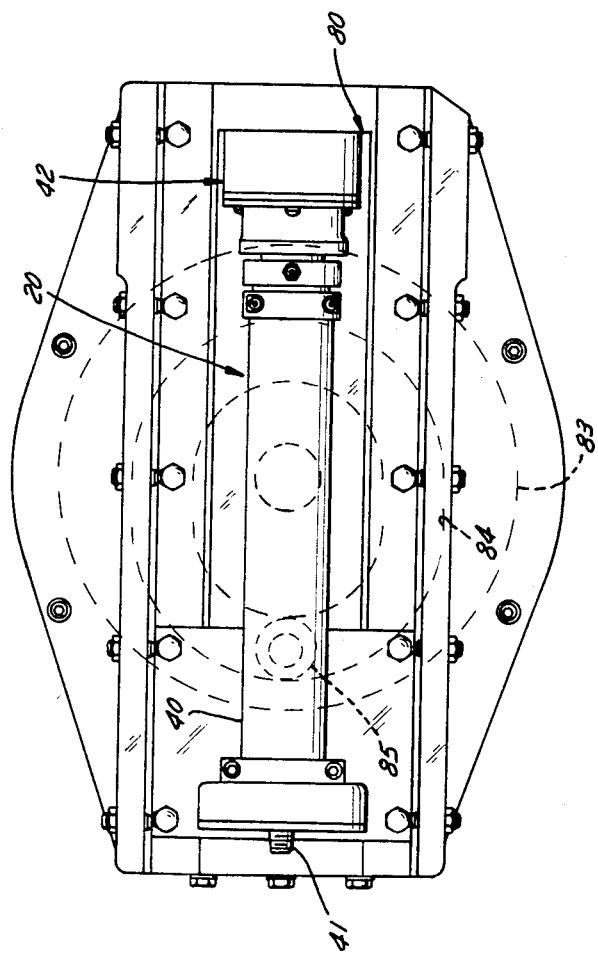
FIG. 21 is a plan view of the heating device of this invention and the means for actuating its nozzle.

The nozzle body 47 is substantially cup-shaped, in that it has a transverse wall 54 across its front. The air outlet holes 53 open radially through its side wall, just behind the front wall 54. Preferably the air outlet holes 53 are small diameter round bores that are spaced at uniform circumferential intervals around the side wall, as best seen in FIGS. 17, 19 and 20. The outside diameter of the nozzle body 47 at its front end is only slightly smaller than the inside diameter of the bottom portion of a cup being formed on the mandrel 11; hence, when the nozzle 42 is in its extended operative position the mouths of the air outlet holes 53 lie closely adjacent to the cup blank surfaces that are to be heated, as can be seen from FIGS. 12 and 20. Because of the size and shape of the air outlet holes 53 and their proximity to the cup blank surfaces, it is believed that hot air issuing from those outlets has a substantial turbulence that is of value in obtaining a fast and uniform transfer of heat to the cup blanks.

When the nozzle 42 is in its operative position, the bottom portion of a cup side wall, closely surrounding the outlet holes 53, substantially throttles the flow of air out of those holes, whereas there is no such restriction to flow of air out of the holes 53 when the nozzle is in its retracted position. If the flow of air through the heating duct 43 were permitted to vary in response to intermittent throttling at the outlet holes 53 as the nozzle moved to and from its operative position, such unsteadiness in the air stream would not only give rise to possible instability of heating element temperature but, more important, would subject the heating element to cyclic air load stresses that could break it in a relatively short time.

To prevent such air flow pulsing, there is a mushroom-shaped throttling element 56 in the nozzle body 47, having a stem portion 57 concentrically secured to the front wall 54 and projecting rearwardly therefrom, and having a concentric head portion 58 with a diameter slightly smaller than the inside diameter of the duct extension 43. The head portion 58 of the throttling element 56 is so located axially in the nozzle body 47 that it is spaced a distance forward of the front end of the duct extension 43 when the nozzle 42 is in its forward operative position (FIGS. 12 and 19) but is concentrically received within the front end of that extension (FIG. 19) when the nozzle is in its rearward inoperative position. The tubular wall of the duct extension 43 is of such thickness that when the nozzle 42 is in its retracted inoperative position, the wall of the duct extension 43—which then surrounds the head 58—cooperates with the head to define a relatively restricted annular passage which substantially throttles the stream of air that is flowing forwardly to the outlet holes 53, whereas in the operative position of the nozzle there is a substantial annular space between the head portion 58 and the radially opposite wall of the nozzle body 47, so that the head 58 effects relatively little throttling of air flow to the outlet holes 53.

It has been found desirable to so locate the head portion 58 of the throttle element that during nozzle retraction it begins to enter the duct extension 43 just slightly after the nozzle outlet holes 53 are clear of a cup bottom; and it is also preferred to give the head portion 58 a substantial amount of rearward conical taper so that it cooperates with the duct extension 43 to produce a steady but quickly increasing throttling effect rather than an abrupt throttling of the air flow. With these expedients, the mushroom-shaped throttling element 56 has been found to cooperate nicely with the pumping effect due to back and forth movement of the nozzle body 47, to the extent that throttling and pumping offset and complement one another to bring about such a steady air flow through the heating duct 40 that no fluctuations can be detected with a sensitively responsive ball-type flow meter.

In practice it has been found desirable to install a somewhat asymmetrical flat baffle 59 in the nozzle body, in a plane normal to the nozzle axis and in a zone axially intermediate outlet holes 53 and the head 58 of the throttling element. The shape of this baffle 59, as found suitable for one installation, can be seen in FIG. 13. The baffle was rotated to a position in which there was uniform outflow of air from all of the air outlet holes 53. Without the baffle 59, hot air issued very strongly from some of the outlet holes 53 and rather weakly from others. The cause of this circumferentially uneven air outflow is not known, but it may be related to the inevitable curvature of the hose (not shown) through which air was delivered to the inlet 41 of the air heating duct 40, and it is possible that a honeycomb air straightener in the duct 40 could eliminate the need for the baffle 59.

In the heating device 20 of this invention the front portion 52 of the nozzle body 47 is surrounded by a generally annular heat shield 60 that not only conserves and stores the heat of the electric heating element during the times when the nozzle 42 is in its inoperative position but also plays an important role in effecting the necessary heating of the cup blank portions that comprise the bottom seal. In addition, the heat shield 60 prevents undesired heating of the mandrels 11 and other structure of the first turret 10. The rather thick substantially tubular wall 62 of the heat shield 60 has an inside diameter substantially larger than the outside diameter of the front portion 52 of the nozzle body, and it has bores 63 that extend through it axially at circumferentially spaced intervals. A shallow circumferential flange 64 at the front end of the heat shield 60 projects radially inwardly from its side wall 62 and has an inside diameter to rather closely surround the bottom portion of a cup when the nozzle 42 is in its operative position. Note that the annular flange 64 is forwardly adjacent to the zone of the outlet holes 53.

The rear portion of the heat shield 60 has an enlarged inside diameter, as at 66, to telescope over the large diameter rear portion 51 of the nozzle body, and the rear end of the heat shield abuts against a radially outwardly projecting attachment flange 67 on that part of the nozzle body, to which the heat shield is secured by means of axially extending screws 68. The enlargement 66 of the inside diameter of the heat shield extends forward to some distance in front of the large diameter rear portion 52 of the nozzle body, and it is of large enough radius to open into all of the bores 63 in the heat shield wall, defining a radial passage 69 which communicates all of those bores 63 with the annular space 70 between the heat shield 60 and the front portion 52 of the nozzle body.

It will be apparent that when the nozzle 42 is in its inoperative (FIG. 19) position hot air issuing from its outlet holes 53 tends to be mainly deflected back along the inner cylindrical surface 71 of the heat shield wall 62, and only a small portion of such air will pass out through the relatively small annular space between the nozzle body 47 and the annular flange 64 on the front of the heat shield. Through the radial passage 69 such rearwardly flowing air enters the axially extending bores 63 in the heat shield. One portion of the hot air which thus enters the bores 63 flows forwardly along them to issue from their front ends; the remainder of such air flows rearwardly in the bores 63 to pass out of the heat shield through registering bores 73 in the attachment flange 67 on the nozzle body.

The proportioning of air that flows forwardly and rearwardly, respectively, in the bores 63 is adjustably controllable by means of a throttling ring 75 which overlies the rear surface of the attachment flange 67 and in which there are axial holes 76 that correspond in diameter and circumferential spacing to the bores 73 in the attachment flange. The throttling ring 75 is secured by means of the screws 68 that fasten the heat shield 60 to the attachment flange 67, and those screws extend through circumferentially elongated slots 78 in the throttling ring 75 so that the latter can be adjustably rotated to bring its holes 76 into and out of complete register with the bores 73 in the attachment flange.

In general it is desirable to have as much as possible of the hot air flow forward through the bores 63 in the heat shield, but ordinarily the rear ends of those bores should not be blocked by adjusting the throttling ring 75 to its completely closed position because too much hot air would then be directed towards the mandrels 11 and other portions of the first turret, causing those parts to be heated excessively.

Much of the heat that is transferred to the heat shield 60 from hot air flowing rearward along its inner surface 71 and forward through its bores 63 is re-transferred to the nozzle body 47 as radiant heat which the nozzle body in turn radiates to the bottom portions of a cup when the nozzle is in its operative position. Thus, during the portion (approximately 50%) of an operating cycle in which the nozzle 42 is in its inoperative position, heat that the heating element has put into the air then issuing from the nozzle is stored in the metal of the nozzle body 47 and the heat shield 60, to be given off to cup blanks as radiant heat when the nozzle is next in its operative position. Such radiant heating plays an important role in effecting the necessary melting of coating on the cup blanks. In fact it is estimated that only about 60% of the heating of the cup blanks is due to direct impingement of hot air against them and the rest is due to radiant heating. For heating efficiency, the inner cylindrical surface 71 of the heat shield 60 has a polished reflective finish and the opposing outer surface of the nozzle body 47 is oxidized.

Heater Nozzle Actuating Mechanism

For actuation of the nozzle 42 between its operative and inoperative positions, there is a carriage 80 on the machine frame that is confined to back and forth motion in directions parallel to the nozzle axis. The carriage 80, in turn, is actuated by a cam mechanism comprising a vertical cam driving shaft 81 which is constrained to rotate in unison with the vertical shaft 82 of the first turret 10, a cam disc 83 which is concentrically secured to the upper end of the cam driving shaft 81 and which has a groove or cam track 84 in its upper surface, and a cam follower 85 that is secured to the carriage 80 and projects downwardly from it, comprising a roller with a vertical axis that rides in the cam groove 84. The cam driving shaft 81 is so connected with the turret shaft 82 (by gears or the like, not shown) as to make a complete revolution for each indexing motion of the turret shaft 82; and as it makes each such revolution, it acts through the cam disc 83 and the cam follower 85 to impart to the carriage 80 a full cycle of back and forth motion by which the nozzle 42 is carried to and from its respective positions and is maintained in those positions during the proper portions of the operating cycle.

The motion of the carriage 80 is imparted to the nozzle 42 by means of a slider 87. Although the slider 87 is so mounted on the carriage 80 as to be slidable relative to it in directions parallel to the directions of nozzle motion, the slider 87 is biased forwardly relative to the carriage, into normal engagement with an abutment 88 on the carriage, by means of a rather stiff compression spring 90 which reacts between the slider and the carriage. Hence the spring 90 and the abutment 88 normally constrain the slider 87 to partake of all motion of the carriage 80. The connection between the slider 87 and the nozzle 42 comprises a downwardly projecting lug 92 on the attachment flange 67 on the nozzle body, through which there extends a forwardly projecting screw 93 that is threaded into a bracket 94 fixed on the slider.

If the first turret 10 should for any reason stop for a significantly longer time than a normal dwell period, a pneumatic jack 95 operates to draw the nozzle 42 back to its inoperative position, against the bias of the spring 90, to avoid damage to cup blanks on the mandrel 11 at the heating station. The cylinder 96 of the jack 95 is fixed to the machine frame, with its axis parallel to the axis of the nozzle 42. The forwardly projecting piston rod 97 of the jack slidably extends through an upwardly projecting lug 98 on the slider 87 and has a rearwardly facing abutment 99 at its front end. When pressure air is fed to the cylinder 96 of the pneumatic jack 95, through a time-of-dwell responsive control system of a type that will be evident to those skilled in the art, the piston rod 97 of the jack is rapidly retracted and it draws the slider 87 rearwardly, compressing the spring 90 and carrying the nozzle 42 all the way to its retracted inoperative position regardless of the position of the carriage 80.

Side Seam Bonding Apparatus

As is generally conventional, the mechanism for actuating each of the clamping blocks 18 comprises a vertical shaft 110 which is slidable up and down in the first turret 10, a bracket 111 fixed to the upper end of each shaft 110 and projecting radially away from the turret axis, and a pivot connection 112 between the bracket 111 and its clamping block that constrains the clamping block to move up and down with its bracket but allows the clamping block to swing freely relative to the bracket about a horizontal axis transverse to the axis of the adjacent mandrel. As the clamping block 18 is brought down toward clamping engagement with the mandrel 11, its freely pivoting connection 112 to the bracket 111 enables it to adjust itself automatically to its orientation for best clamping cooperation with the tapering surface of the mandrel.

The vertical shafts 110 that raise and lower the respective clamping blocks 18 are spaced at uniform radial distances from the turret axis. Each has on its bottom a fitting 114 in which a cam follower roller 116 is confined to rotation. The several cam follower rollers 116 ride on the top surface of a ring cam 117 that is fixed to the machine frame and concentrically surrounds the turret shaft 82. The elevations and depressions of the top surface of the ring cam 117 raise and lower the shafts 110 during the course of rotation of the first turret 10, thus moving the clamping blocks 18 towards and from their respective mandrels 11 at the proper times in the cycle of turret rotation.

For application of downward clamping force to each clamping block 18 there is a coiled spring 119 surrounding the lower portion of its actuating shaft 110 and confined under compression between the fitting 114 on the bottom of the shaft 110 and a downwardly facing shoulder on the turret structure.

As pointed out hereinabove, after the bottom portion of a cup on a mandrel 11 has been heated by the heating device 20 of this invention, a plunger portion 14 of the mandrel is extended to force the bottom wall blank 5 downwardly relative to the side wall blank 6, thus wedging the flange 13 of the bottom wall blank into snug engagement with the side wall for formation of a tight bottom seam in the finished cup.

In prior machines for making downwardly tapering paper cups wherein the mandrel comprised a plunger that shifted the bottom wall blank downwardly relative to the side wall, the plunger was cylindrical, and it moved within an end ring on the tip portion of the frustoconical mandrel. The end ring had a cylindrical inner surface and had a concentric frustoconical outer surface that met the inner surface at an annular knife edge around the small-diameter end of the mandrel. With this arrangement the end ring was fixed to the body portion of the mandrel, and the plunger moved out only to the point where its flat axially outer surface was flush with the annular knife edge on the end ring. The plunger therefore did not come into contact with the side wall blank when it extended. However, the knife edge portion of the end ring was very fragile and was easily broken as a result of the substantial swings in temperature to which it was subject during the course of a turret rotation and by the forces that the clamping block exerted upon it. In consequence, broken end rings frequently had to be replaced on the mandrels of such prior machines.

With the cup making machine of the present invention this source of annoyance and expense has been eliminated because the mandrels 11 do not have end rings. Instead, the plunger 14 is, in itself, the outer end portion of the mandrel 11, in that its side surface is frustoconical and has exactly the same taper as the fixed body portion 15 of the mandrel. However, the larger-diameter end of the plunger 14 has a slightly smaller diameter than the adjacent small-diameter end of the fixed body portion 15, so that when the plunger 14 is retracted there is a small but abrupt step-down in diameter between the body portion 15 and the plunger 14, which step-down is somewhat exaggerated, for clarity, in FIGS. 19 and 20. This reduction in plunger diameter is such that when the plunger 14 is extended, as shown in FIG. 11, it provides, in effect, a smooth continuation of the conical frustum defined by the body portion 15, and therefore extension of the plunger does not impose any radially expanding stress on the bottom portion of the cup wall. Explained in another way, when the plunger 14 is in its retracted position, its frustoconical surface, all around the plunger, has a slight radial spacing from the surrounding cup side wall, but upon extension of the plunger its said surface just comes into contact with that side wall.

To cooperate with the tapered plunger 14, the bottom or clamping surface 101 of the clamping block 18, which engages the overlapped side seam portions of the side wall blank to clamp them against the mandrel, has a slight downward step or outward offset, as at 102 (best seen in FIG. 10) in its portion that opposes the plunger 14. Hence, while the plunger 14 is retracted, the overlapped portions of the side wall blank that define the side seam are under clamping pressure all along their lengths. Because of the step-down in mandrel diameter at the plunger 14 and the mating step or offset 102 in the clamping block 18, a small bump or jog tends to be impressed into the side seam of the finished cup, a little above the bottom wall, but the bump is so inconspicious as not to be objectionable.

When the plunger 14 is extended, the bottom clamping surface 101 of the clamping block 18 no longer mates with the frustoconical mandrel surface, and the clamping block swings slightly about its pivot connection 112 to an orientation in which it clampingly engages the side seam substantially only at two points along it. However, the thermoplastic coating on cup blanks sets up and bonds rather quickly, so that at the time when the plunger 14 extends the side seal is well enough bonded not to require clamping all along its length. Of course, even though the clamping block maintains clamping engagement with the side seam only at small spaced apart zones, such engagement does confine that seam against any tendency to come apart.

As is generally conventional, extension of the plunger 14 is accomplished at the proper time in rotation of the first turret 10 by admitting pressure air into a cylinder chamber 120 in the mandrel 11, to act on a piston 121 on the radially inner end portion of the stem 122 of the plunger. For applying suction to the vacuum inlets 16 in the end surface of the plunger, the plunger stem 122 is tubular and extends through the cylinder chamber 120 and beyond the same in the axially inward direction, to communicate with a vacuum duct 124. When a mandrel 11 arrives at the discharge station H in the course of rotation of the first turret, pressure air is fed to the vacuum inlets 16, to blow the finished cup off of the mandrel, and at about the same time the cylinder chamber 120 is communicated with the suction source for drawing the plunger back to its retracted position.

From the foregoing description taken with the accompanying drawings it will be apparent that this invention provides a paper cup making machine having improved devices for contactlessly heating the seam forming portions of the cup blanks. Said devices have electric heating elements as their heat sources, and they are so arranged as to impose upon the heating elements substantially no vibrations or accelerations that would affect their longevity. It will also be apparent that the heating devices in the cup machine of this invention are so arranged as not to cause overheating of cup blanks in the event of any stoppage or undue delay in turret rotation, and that the machine further minimizes production delays and down times by having no knife-edged end rings on its mandrels.

What we claim is:

1. In a machine for making cups of thermoplastic coated paper, each comprising a side wall blank and a disc-like bottom wall blank that has its margin formed as a circumferential axially projecting flange portion, said machine comprising a mandrel around which a side wall blank is rolled and which has at an outer end thereof a flat outwardly facing surface against which a bottom wall blank is held with its flange portion projecting outwardly and surrounded by a bottom portion of the rolled side wall blank, heating means for melting coating on said portions of the blanks to provide for their adhesion to one another, said heating means comprising:
   A. an air duct with which the mandrel has coaxial alignment and which has a rear end remote from the mandrel, said air duct having near its rear end an inlet connectable with a source of air under substantially constant pressure;
   B. an electric heater in said air duct by which air is heated in flowing forwardly through said duct from said inlet;
   C. a nozzle on the front end portion of said air duct, coaxially slidable relative thereto between a forward operative position in which said nozzle is substantially concentrically received within said portions of blanks on the mandrel and a retracted rearward position in which the nozzle is spaced a substantial distance outwardly from the mandrel, said nozzle
      (1) being closed at its front end and
      (2) having radially opening outlets near its front end from which air that has passed through the air duct is emitted for heating said portions of blanks on the mandrel when the nozzle is in its operative position; and
   D. cooperating coaxial throttling means in said nozzle and said duct, arranged to define a restricted annular passage through which air flows in passing from the air duct into the nozzle when the nozzle is in its retracted position but to provide for substantially unrestricted flow from the air duct into the nozzle when the nozzle is in its operative position.

2. The machine of claim 1 wherein the nozzle is substantially cup shaped and has a front end wall and a side wall that axially slidably surrounds a tubular front end portion of the air duct, further characterized by said throttling means comprising:
   a substantially mushroom-shaped throttling member having
      (1) a stem portion secured to said front end wall of said nozzle and projecting coaxially rearwardly therefrom and
      (2) a coaxial head portion smaller in diameter than the inside diameter of said front end portion of the air duct and which cooperates therewith to define said restricted annular passage.

3. The machine of claim 1, further characterized by:
   E. a heat shield comprising an annular wall coaxially surrounding the front end portion of said nozzle in radially spaced substantially concentric relation thereto and defining therewith an annular passage through which hot air issuing from said outlets is deflected rearwardly along said nozzle.

4. The machine of claim 3, wherein said annular wall of the heat shield is substantially thick, further characterized by:
   F. said wall having circumferentially spaced axially extending bores therein that open to its front end and which are radially communicated near their rear ends with said annular passage to receive hot air therefrom and conduct it forwardly in heat transfer relation to said annular wall.

5. The machine of claim 3 wherein said bores have outlets at their rear ends, further characterized by:

G. means on said nozzle for adjustably restricting said outlets of the bores to control the relative proportions of hot air that flow rearwardly through those outlets and forwardly through the bores.

6. In a machine for making cups of thermoplastic coated paper, each comprising a side wall blank and a disc-like bottom wall blank that has its margin formed as a circumferential axially projecting flange portion, said machine comprising a mandrel around which a side wall blank is rolled and which has at an outer end thereof a flat outwardly facing surface against which a bottom wall blank is held with its flange portion projecting outwardly and surrounded by a bottom portion of the rolled side wall blank, heating means for melting coating on said portions of the blanks to provide for their adhesion to one another, said heating means comprising:
- A. a stationary air duct with which the mandrel can have coaxial alignment and which has a rear end remote from the mandrel wherein there is an air inlet;
- B. an electric heater in said air duct for heating air that flows forwardly therethrough from said inlet;
- C. a hollow nozzle body into which said air duct opens forwardly and which is axially slidable on the front end portion of said air duct between a forward operative position and a rearward inoperative position, the front end portion of said nozzle body
  - (1) having an outside diameter to be closely coaxially receivable within the bottom portion of a rolled side wall blank on the mandrel and
  - (2) having circumferentially spaced air outlets that open radially outwardly from its interior; and
- D. said nozzle body and said air duct having cooperating throttling portions which restrict flow of air from the air duct to said air outlets when the nozzle body is in its inoperative position and which permit substantially unrestricted flow of air from said air duct to said outlets when the nozzle body is in its operative position.

7. The machine of claim 6, further characterized by:
- E. an annular heat shield concentrically surrounding said nozzle body in radially spaced relation thereto and defining therewith an annular passage in which hot air issuing from said air outlets can flow rearwardly.

8. The machine of claim 7, further characterized by:
- F. said heat shield having therein a further passage opening to the front thereof, spaced radially outwardly from said annular passage, and communicated with said annular passage near the rear end of the latter.

9. The machine of claim 6, having a turret which comprises said mandrel and which is indexingly rotated to carry said mandrel to and from coaxial alignment with said air duct, further characterized by:
- E. a carriage constrained to move in the directions of nozzle body motion and in synchronism with indexing rotation of the turret to operative and inoperative positions corresponding to those of the nozzle body;
- F. a slider having a rigid connection with the nozzle body and slidable in said directions relative to the carriage;
- G. means cooperating with said slider and the carriage to bias the slider forwardly to a predetermined position relative to the carriage, so that the nozzle body is normally constrained to partake of all motion of the carriage; and
- H. an actuator having a lost motion connection with the slider and arranged to move the slider rearwardly relative to the carriage against bias, for actuating the nozzle body to its inoperative position irrespective of the position of the carriage.

10. In a machine for making cups of thermo-plastic coated paper, each comprising a side wall blank and a disc-like bottom wall blank that has its margin formed as a circumferential axially projecting flange portion, said machine comprising a mandrel around which a side wall blank is rolled and which has at an outer end thereof a flat outwardly facing surface against which a bottom wall blank is held with its flange portion surrounded by a bottom portion of the rolled side wall blank, heating means for melting coating on said portions of the blanks to provide for their adhesion to one another, said heating means comprising:
- A. an air duct with which the mandrel can have coaxial alignment and which has a front end proximal to said outer end of the mandrel;
- B. means for delivering heated air through said air duct to the front end portion thereof;
- C. a hollow nozzle body at the front of said air duct into which said air duct opens forwardly, said nozzle body being movable between a forward operative position and a rearward inoperative position, the front end portion of said nozzle body
  - (1) having an outside diameter to be closely coaxially receivable within the bottom portion of a rolled side wall blank on the mandrel and
  - (2) having circumferentially spaced air outlets that open radially outwardly from its interior;
- D. a heat shield comprising a tubular wall surrounding the front end portion of said nozzle body in radially spaced substantially concentric relation thereto and defining therewith an annular passage through which hot air issuing from said outlets is deflected rearwardly along said nozzle body;
- E. said heat shield having a substantially reflective radially inner surface whereby heat of air flowing through said annular passage tends to be radiated to said nozzle body; and
- F. said nozzle body having a dull radially outer surface so that it tends to absorb heat of air flowing through said annular passage.

11. The machine of claim 10, further characterized by:
- G. cooperating throttling means on the front portion of said air duct and concentrically fixed in said nozzle body, effective when the nozzle body is in its rearward position to substantially restrict flow of air to said air outlets but permitting substantially unrestricted flow of air to said air outlets when the nozzle body is in its forward position.

12. The machine of claim 10 wherein said heat shield has a substantially thick tubular wall, further characterized by:
- G. said wall having circumferentially spaced axially extending bores therein, each of which opens to the front end of said tubular wall and each of which is communicated near its rear end with said annular passage to provide for forward flow through the bore of hot air that has flowed rearwardly through said annular passage.

13. In a machine for making cups of thermoplastic coated paper, each comprising a side wall blank and a disc-like bottom wall blank that has its margin formed as a circumferential axially projecting flange portion, said machine comprising a mandrel around which a side wall blank is rolled and which has at an outer end thereof a flat outwardly facing surface against which a bottom wall blank is held with its flange portion surrounded by a bottom portion of the rolled side wall blank, heating means for melting coating on said portions of the blanks to provide for their adhesion to one another, said heating means comprising:

- A. an air duct with which the mandrel can have coaxial alignment and which has a front end proximal to said outer end of the mandrel;
- B. means for delivering heated air through said air duct to the front end portion thereof;
- C. a hollow nozzle body at the front of said air duct into which said air duct opens forwardly, said nozzle body being movable between a forward operative position and a rearward inoperative position, the front end portion of said nozzle body
  - (1) having an outside diameter to be closely coaxially receivable within the bottom portion of a rolled side wall blank on the mandrel and
  - (2) having circumferentially spaced air outlets that open radially outwardly from its interior;
- D. a heat shield comprising a substantially thick tubular wall surrounding the front end portion of said nozzle body in radially spaced substantially concentric relation thereto and defining therewith an annular passage through which air issuing from said outlets is deflected rearwardly along said nozzle body;
- E. said tubular wall having circumferentially spaced axially extending bores therein which
  - (1) open to the front end of said tubular wall,
  - (2) are communicated near their rear ends with said annular passage, to provide for forward flow through the bores of heated air that has flowed rearwardly through said annular passage, and
  - (3) are also communicated near their rear ends with bore outlets through which heated air can pass out of the heat shield; and
- F. means for adjustably restricting said bore outlets to control the relative proportions of heated air that are discharged through said bore outlets and flow forwardly through said bores.

14. The machine of claim 13, further characterized by:

- G. said heat shield having a substantially reflective radially inner surface whereby heat of air flowing through said annular passage tends to be radiated to said nozzle body; and
- H. said nozzle body having a dull radially outer surface so that it tends to absorb heat of air flowing through said annular passage.

15. The machine of claim 13, wherein said nozzle body is movable relative to the air duct between its said operative and retracted positions, further characterized by:

- (1) said means for delivering heated air through said air duct to the front end thereof comprising
  - (a) an inlet in the rear end of said air duct connectable with a source of air under pressure and
  - (b) an electric heater in said air duct by which air is heated in flowing forwardly therethrough from said inlet; and
- (2) cooperating coaxial throttling means in said nozzle body and said air duct, arranged to define a restricted annular passage through which air flows in passing from the air duct into the nozzle body when the latter is in its retracted position but to provide for substantially unrestricted flow from the air duct into the nozzle body when the latter is in its operative position.

* * * * *